US012792506B2

(12) United States Patent
Shim

(10) Patent No.: US 12,792,506 B2
(45) Date of Patent: Nov. 10, 2026

(54) MEMORY CONTROLLER, MEMORY SYSTEM INCLUDING MEMORY CONTROLLER, AND OPERATING METHOD OF MEMORY CONTROLLER

(71) Applicant: Samsung Electronics Co., Ltd., Suwon-si (KR)

(72) Inventor: Sejin Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/985,562

(22) Filed: Dec. 18, 2024

(65) Prior Publication Data

US 2025/0225074 A1 Jul. 10, 2025

(30) Foreign Application Priority Data

Jan. 5, 2024 (KR) ........................ 10-2024-0002334

(51) Int. Cl.
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS 8,125,827 B2 2/2012 Park
9,251,891 B1 * 2/2016 Hu ........................ G11C 16/26
9,275,739 B2 3/2016 Yano
10,019,353 B2 7/2018 Orme et al.
10,199,111 B1 2/2019 Besinga et al.
11,581,046 B2 2/2023 Kuribara et al.
11,853,553 B2 * 12/2023 Noda .................... G06F 3/0611
2014/0092683 A1 * 4/2014 Hyun ..................... G11C 16/32 365/185.05
2016/0092241 A1 * 3/2016 Gschwind ............. G06F 9/3001 712/22
2018/0181462 A1 * 6/2018 Shukla ................ G06F 11/1012
2019/0102097 A1 * 4/2019 Madraswala .......... G11C 16/26
2022/0093194 A1 * 3/2022 Lee .................... G11C 16/3459
2023/0015496 A1 1/2023 Oh et al.
2023/0221895 A1 7/2023 Jung et al.

FOREIGN PATENT DOCUMENTS

CN 113064843 A * 7/2021 ........... G06F 3/0689
KR 10-1391362 B1 5/2014

* cited by examiner

*Primary Examiner* — Jared I Rutz
*Assistant Examiner* — Elias Young Kim
(74) *Attorney, Agent, or Firm* — Fish & Richardson P.C.

(57) ABSTRACT

A memory system includes a memory device including a memory cell array and an offset table, and a memory controller configured to generate a target operation parameter set corresponding to a current situation of the memory device and, in response to a target index being assigned to the target operation parameter set, transmit the target index to the memory device. The offset table includes mapping information between sample operation parameter sets respectively corresponding to sample situations of the memory device and indices respectively assigned to the sample operation parameter sets. The memory device is configured to obtain target operation parameters mapped to the target index based on the offset table, adjust read voltages based on the target operation parameters, and read data stored in the memory cell array by using the adjusted read voltages.

15 Claims, 17 Drawing Sheets

10

MEMORY CONTROLLER, MEMORY SYSTEM INCLUDING MEMORY CONTROLLER, AND OPERATING METHOD OF MEMORY CONTROLLER

CROSS-REFERENCE TO RELATED APPLICATION

This application is based on and claims priority under 35 U.S.C. § 119 to Korean Patent Application No. 10-2024-0002334, filed on Jan. 5, 2024, in the Korean Intellectual Property Office, the disclosure of which is incorporated by reference herein in its entirety.

BACKGROUND

Inventive concepts to a memory system, and more particularly, to a memory controller and/or a memory device for reducing a time taken to transmit an operation parameter set and improve (or adjust) the performance of a memory system by transmitting an index corresponding to the operation parameter set to the memory device.

A nonvolatile memory device as a memory device includes a plurality of memory cells in which data is stored in a nonvolatile manner. A flash memory device that is an example of a nonvolatile memory device may be used in one or more of a mobile phone, a digital camera, a portable data terminal (e.g., personal digital assistant (PDA)), a mobile computer device, a stationary computer device, and various other types of devices.

Operational characteristics of a memory device may vary according to a situation of the memory device. The situation of the memory device may be or may correspond to or be based on one of state conditions such as one or more of a temperature condition, a program time condition, and an erase count of the memory device, or a combination thereof. An operation parameter set may be transmitted to the memory device to compensate for operational characteristics of the memory device. When the operation parameter set is transmitted to the memory device, the transmission may take a lot of time.

There is a need for, or a desire for, technology for more efficiently compensating for operational characteristics of a memory device by using an operation parameter set while reducing a time used.

SUMMARY

Various example embodiments provide a memory system for reducing a time taken to compensate for operational characteristics of a memory device by transmitting the target index, instead of the target operation parameter set, to the memory device and compensating for the operational characteristics of the memory device by using the target operation parameter set mapped to the target index when there is a target index assigned to a target operation parameter set.

According to various example embodiments, there is provided a memory system including a memory device that includes a memory cell array and an offset table, and a memory controller configured to generate a target operation parameter set corresponding to a current situation of the memory device and, in response to a target index assigned to the target operation parameter set, transmit the target index to the memory device, wherein the offset table includes mapping information between sample operation parameter sets respectively corresponding to sample situations of the memory device and indices respectively assigned to the sample operation parameter sets, wherein the memory device is configured to obtain target operation parameters mapped to the target index based on the offset table, adjust read voltages based on the target operation parameters, and read data stored in the memory cell array by using the adjusted read voltages.

Alternatively or additionally according to various example embodiments, there is provided a memory controller including an index processor configured to generate sample operation parameter sets corresponding to sample situations of a memory device and indices respectively assigned to the sample operation parameter sets, generate a target operation parameter set corresponding to a current situation of the memory device and associated with compensating operational characteristics of the memory device in the current situation, and determine whether the target operation parameter set is matched to one of the sample operation parameter sets and a target index is assigned to the target operation parameter set, and transmit operation data that is different based on whether there is the target index, and a memory interface configured to transmit the operation data to the memory device, the operation data being one of target index and the target operation parameter set.

Alternatively or additionally according to various example embodiments, there is provided an operating method of a memory controller, the operating method including generating sample operation parameter sets and indices respectively assigned to the sample operation parameter sets to be stored as an offset table included in a memory device, generating a target operation parameter set corresponding to a current situation of the memory device, determining whether the target operation parameter is matched to one of the sample operation parameter sets and a target index is assigned to the target operation parameter set, and transmitting one of the target index and the target operation parameter set to the memory device based on the determining.

BRIEF DESCRIPTION OF THE DRAWINGS

Various example embodiments will be more clearly understood from the following detailed description taken in conjunction with the accompanying drawings in which.

DETAILED DESCRIPTION OF EXAMPLE EMBODIMENTS

Figure 1:
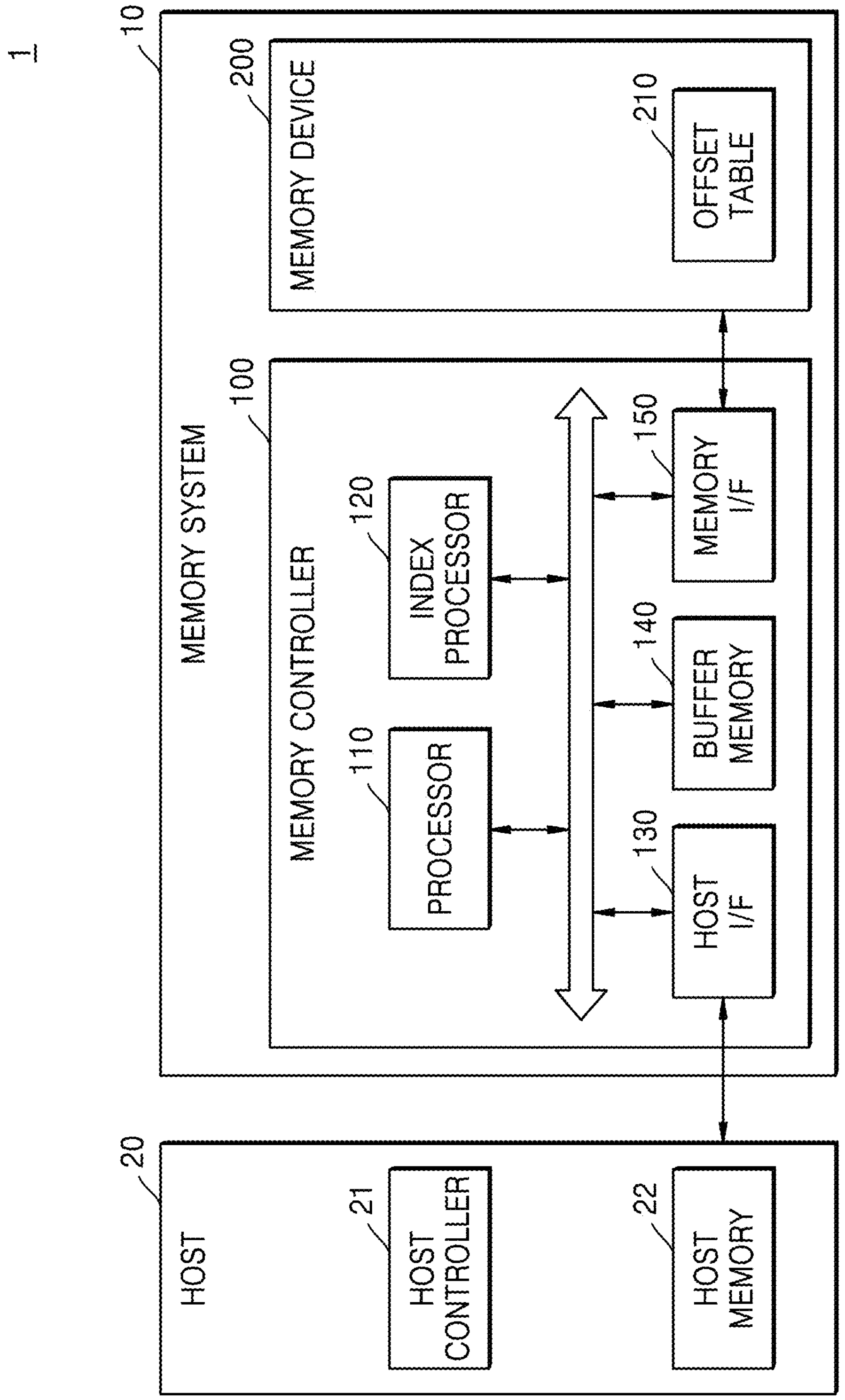
FIG. 1 is a block diagram illustrating a host-storage system, according to various example embodiments.

Hereinafter, some example embodiments will be described in detail with reference to the accompanying drawings. In the drawings, the same elements are denoted by the same reference numerals, and a repeated description thereof will be omitted.

FIG. 1 is a block diagram illustrating a host-storage system, according to various example embodiments.

Referring to FIG. 1, a host-memory system 1 may include a host 20 and a memory system 10. The memory system 10 may include a memory controller 100 and a memory device 200. According to various example embodiments, the host 20 may include a host controller 21 and a host memory 22. The host memory 22 may function as a buffer memory for temporarily storing data to be transmitted to the memory system 10 and/or data transmitted from the memory system 10.

The host 20 may transmit various types of commands corresponding to a user' requests to the memory system 10. Accordingly, the memory system 10 may perform operations corresponding to the commands. The term "command" may refer to a work request and/or instructions; examples are not limited thereto.

The memory system 10 may include storage media for storing data according to a request from the host 20. For example, the memory system 10 may include at least one of a solid-state drive (SSD), an embedded memory, and a removable external memory. When the memory system 10 is (or includes) an SSD, the memory system 10 may be or include a device following the nonvolatile memory express (NVMe) standard. When the memory system 10 is (or includes) an embedded memory or an external memory, the memory system 10 may be (or include) a device following the universal flash storage (UFS) and/or embedded multimedia card (eMMC) standard. Each of the host 20 and the memory system 10 may generate and transmit a packet according to the adopted standard protocol.

According to various example embodiments, the host controller 21 and the host memory 22 may be implemented as separate semiconductor chips. Alternatively, in some example embodiments, the host controller 21 and the host memory 22 may be integrated in the same semiconductor chip. For example, the host controller 21 may be any one of a plurality of modules provided in an application processor, and the application processor may be implemented as a system-on-chip (SoC). The host memory 22 may be or include an embedded memory provided in the application processor, or may be or include a nonvolatile memory and/or a memory module located outside the application processor.

The host controller 21 may manage an operation of storing data (e.g., write data) of the host memory 22 in the memory device 200 or storing data (e.g., read data) of the memory device 200 in the host memory 22.

The memory system 10 may include the memory controller 100 and the memory device 200. The memory controller 100 may control the memory device 200 to read data stored in the memory device 200 or write (or program) data to the memory device 200 in response to a write/read request from the host 20. The memory controller 100 may include a processor 110, an index processor 120, a host interface 130, a buffer memory 140, and a memory interface 150. The memory controller 100 may further include other elements when necessary. For example, elements of the memory controller 100 may communicate with each other through a bus such as a wired and/or wireless bus.

The processor 110 may include a central processing unit (CPU) and/or a microprocessor and may control an overall operation of the memory controller 100. In various example embodiments, the processor 110 may be implemented as a multi-core processor, for example, a dual-core processor and/or a quad-core processor.

The index processor 120 may generate operation parameter sets respectively corresponding to a plurality of situations of the memory device 200. The plurality of situations of the memory device 200 may include or be based on one or more than one of state conditions such as a temperature condition, a program time condition, and an erase count of the memory device 200, or a combination thereof. Operational characteristics of the memory device 200 may vary according to a situation of the memory device 200. For example, during a read operation, an error may occur in data read based on a read voltage according to the plurality of situations of the memory device 200.

The index processor 120 may generate the operation parameter sets respectively corresponding to the plurality of situations to compensate for the operational characteristics of the memory device 200 in each of the plurality of situations. The term "operation parameter set" may refer to a set of operation parameters for compensating for or for adjusting for the operational characteristics of the memory device 200 in a specific situation. One operation parameter set may include or be based on one or more operation parameters, for example, four operation parameters, but inventive concepts are not limited thereto. For example, during a read operation, an operation parameter may include an offset level of a read voltage. The memory device 200 may perform a memory operation based on the operation parameter set.

In various example embodiments, the index processor 120 may generate sample operation parameter sets by extracting some of the operation parameter sets corresponding to the plurality of situations. The index processor 120 may extract sample situations from among the plurality of situations. The sample operation parameter sets may be or may include operation parameter sets respectively corresponding to the sample situations.

The index processor 120 may extract relatively frequently occurring situations from among the plurality of situations as the sample situations and may extract the sample operation parameter sets. For example, the index processor 120 may extract the sample operation parameter sets from among the operation parameter sets respectively corresponding to the plurality of situations based on a use frequency of an operation parameter set.

In various example embodiments, the index processor 120 may respectively assign indices to the sample operation parameter sets. For example, the index processor 120 may assign a first index to a first sample operation parameter set corresponding to a first sample situation. The index processor 120 may assign a second index to a second sample operation parameter set corresponding to a second sample situation. The index processor 120 may transmit the sample operation parameter sets and the indices respectively assigned to the sample operation parameter sets to be stored as an offset table 210 of the memory device 200.

For example, in an initialization period, the memory controller 100 may generate the sample operation parameter sets and the indices respectively applied to the sample operation parameter sets and may store the sample operation parameter sets and the indices as or in the offset table 210. In detail, in an initialization period, the memory controller 100 may generate the operation parameters corresponding to the plurality of situations, may extract the sample operation parameter sets based on a use frequency of an operation parameter set, may respectively assign the indices to the sample operation parameter sets, and may store the sample operation parameter sets and the indices as or in the offset table 210. The initialization period may precede a read period in which a read operation is performed. The term "initialization period" may refer to an initialization period of the memory system 10. For example, the memory controller 100 may perform setting operations for performing a memory operation (e.g., a write operation and/or a read operation) on the memory device 200 in the initialization period.

However, inventive concepts are not limited thereto, and the memory controller 100 may flexibly generate the sample operation parameter sets and the indices respectively assigned to the sample operation parameter sets and may store the sample operation parameter sets and the indices as the offset table 210. Even after the initialization period, the memory controller 100 may extract relatively frequently occurring situations from among the plurality of situations as the sample situations and may generate the sample operation parameter sets. Even after the initialization period, the memory controller 100 may generate the sample operation parameter sets and the indices respectively assigned to the sample operation parameter sets and may store the sample operation parameter sets and the indices as the offset table 210. For example, in a read period, the memory controller 100 may generate the sample operation parameter sets and the indices, and may store the sample operation parameter sets and the indices as the offset table 210.

In some examples, the memory controller 100 may perform an operation of generating the sample operation parameter sets, the indices, and the offset table 210 in and after the initialization period. For example, the memory controller 100 may update or change the offset table 210 stored in the initialization period, based on the sample operation parameters and the indices generated in the read period.

In various example embodiments, the index processor 120 may generate a target operation parameter set corresponding to a current situation of the memory device 200 and may determine whether there is a target index assigned to the target operation parameter set. The term "target operation parameter set" may refer to an operation parameter set corresponding to a current situation, and the term "target index" may refer to an index assigned to the target operation parameter set. For example, the index processor 120 may generate a target operation parameter set in a read period during a read operation.

The index processor 120 may check whether there is an operation parameter set matched to the target operation parameter set from among the generated sample operation parameter sets. When there is the target operation parameter set from among the sample operation parameter sets, an index may be assigned to the target operation parameter set. When a current situation of the memory device 200 is one of frequently occurring sample situations from among the plurality of situations, there may be an index assigned to the target operation parameter set.

The index processor 120 may transmit one of the target index and the target operation parameter set to the memory device 200 based on whether there is the target index assigned to the target operation parameter set. In detail, the index processor 120 may transmit one of the target index and the target operation parameter set to the memory device 200 through the memory interface 150.

When there is the target index assigned to the target operation parameter set, the index processor 120 may transmit the target index to the memory device 200. The memory device 200 may obtain the target operation parameter set mapped to the target index received by using the offset table 210 and may compensate for, or adjust, a memory operation by using the target operation parameter set.

When there is no target index assigned to the target operation parameter set, the index processor 120 may transmit the target operation parameter set to the memory device 200. The memory device 200 may compensate for, or adjust, a memory operation by using the target operation parameter set. When there is an assigned index, the memory controller 100 may transmit the index with a relatively small data amount to the memory device 200, and a time taken to transmit data to the memory device 200 may be reduced. Accordingly, an operating speed of the memory system 10 may be improved.

In some example embodiments, in relation to a command for controlling a memory operation of the memory device 200, the index processor 120 may generate a different operation command according to a type of operation data transmitted to the memory device 200. The operation data may include an index and an operation parameter set. When the index is transmitted as the operation data, the index processor 120 may generate a first operation command, and when the operation parameter set is transmitted as the operation data, the index processor 120 may transmit a second operation command. For example, during a read operation, when the index is transmitted to the memory device 200, the index processor 120 may generate the first read command, and when the operation parameter set is transmitted, the index processor 120 may generate the second read command.

According to various example embodiments, the index processor 120 may be implemented as one or more of software, firmware, and/or hardware. In various example embodiments, the index processor 120 may be implemented as software, the memory controller 100 may further include a working memory into which the index processor 120 is loaded, and the processor 110 may control an operation of transmitting one of the target index and the target operation parameter set to the memory device 200 by executing the index processor 120. For example, the working memory may be implemented as a volatile memory such as one or more of an SRAM or a DRAM, and/or as a nonvolatile memory such as one or more of a flash memory or a PRAM.

The host interface 130 may transmit and receive a packet to and from the host 20. The packet transmitted from the host 20 to the host interface 130 may include one or more of a command, data, or the like to be written to the memory device 200, and the packet transmitted from the host interface 130 to the host 20 may include a response to the command and/or data read from the memory device 200.

In some example embodiments, the buffer memory 140 may temporarily store data to be written to the memory device 200 and/or data to be read from the memory device 200. The buffer memory 140 may be an element provided in the memory controller 100, or may be located outside the memory controller 100. For example, the memory controller 100 may further include a buffer memory manager and/or a buffer memory interface for communicating with the buffer memory 140.

The memory interface 150 may transmit data to be written to the memory device 200 to the memory device 200, and/or may receive data read from the memory device 200. The memory interface 150 may be implemented to comply with the standard protocol such as Toggle and/or ONFI; however, example embodiments are not limited thereto.

In various example embodiments, although not shown in FIG. 1, the memory controller 100 may further include one or more of a packet manager, an error correction code (ECC) engine, and an advanced encryption standard (AES) engine. The package manger may generate a packet according to a protocol of an interface predefined with the host 20 or may parse various information from a packet received from the host 20.

The ECC engine may perform an error detection and correction function on read data read from the memory device 200. In more detail, the ECC engine may generate parity bits for write data to be stored in the memory device 200, and the generated parity bits may be stored in the memory device 200 together with the write data. When data is read from the memory device 200, the ECC engine may identify, or may identify and correct an error of read data by using the parity bits read from the memory device 200 together with the read data and may output the read data with the error corrected.

The AES engine may perform at least one of an encryption operation and a decryption operation on data input to the memory controller 100 by using a symmetric-key algorithm.

The memory device 200 may include a nonvolatile memory device such as a flash memory. The flash memory may include a 2D NAND memory array and/or a 3D vertical NAND (VNAND) memory array. The 3D memory array is monolithically formed in one or more physical levels of arrays of memory cells having an active area disposed above a silicon substrate and a circuit associated with the operation of the memory cells, whether such associated circuitry is above or within such substrate. The term "monolithic" means that layers of each level of the array are directly deposited on layers of each underlaying level of the array.

In various example embodiments, the 3D memory array may include vertical NAND strings vertically arranged so that at least one memory cell is located on another memory cell. The at least one memory cell may include a charge trap layer.

Inventive concepts are not limited thereto, and the memory device 200 may include various other types of memories. For example, the memory device 200 may include a nonvolatile memory, and the nonvolatile memory may include any or more than one of various types memories such as a magnetic RAM (MRAM), a spin-transfer torque MRAM, a conductive bridging RAM (CBRAM), a ferroelectric RAM (FeRAM), a phase RAM (PRAM), resistive RAM, a nanotube RAM, polymer RAM (PoRAM), a nano floating gate memory (NFGM), holographic memory, a molecular electronics memory, or an insulator resistance change memory. Hereinafter, the following will be described assuming that the memory device 200 is a NAND flash memory device.

In various example embodiments, the memory device 200 may include a plurality of dies, and each die may include a plurality of planes. Each plane may include a plurality of memory blocks (a memory block may also be referred to as a block). Each of the plurality of memory blocks may include a plurality of pages, and each of the plurality of pages may include a plurality of memory cells sharing one word line. For example, a block may be a unit for an erase operation, and a page may be a unit for write and read operations. In some example embodiments, a size of each of the memory block and/or a size of each of the planes may be the same as each other; however, example embodiments are not limited thereto.

The memory device 200 may include the offset table 210. For example, the offset table 210 may be stored in a register included in the memory device 200. However, inventive concepts are not limited thereto. The offset table 210 may include mapping information between the sample operation parameter sets respectively corresponding to the sample situations of the memory device 200 and the indices respectively assigned to the sample operation parameter sets. For example, in an initialization period, the offset table 210 may be stored. However, inventive concepts are not limited thereto, and the offset table 210 may alternatively or additionally be stored at a flexible time point. For example, the offset table 210 may be stored in a read period, and/or the offset table 210 stored in an initialization period may be updated in a read period.

The memory device 200 may compensate for, or may adjust, the operational characteristics of the memory device 200 based on the offset table 210. For example, the memory device 200 may compensate for or adjust the operational characteristics of the memory device 200 in a read period during a read operation. In various example embodiments, when the target index is received from the memory controller 100, the memory device 200 may obtain the target operation parameter set mapped to the target index by using the offset table 210. The memory device 200 may compensate for or adjust the operational characteristics of a memory operation of the memory device 200 based on the target operation parameter set. For example, the memory operation may include a write operation and a read operation.

In a read operation, the target operation parameter set may include offset levels of a read voltage. The memory device 200 may adjust the read voltage based on target operation parameters of the target operation parameter set. The memory device 200 may read data stored in a memory cell array by using the adjusted read voltage.

In various example embodiments, when the target operation parameter set is received from the memory controller 100, the memory device 200 may compensate for or may adjust the operational characteristics of the memory device 200 based on the target operation parameter set. When the target operation parameter set is received, the memory device 200 may not use the offset table 210. In a read operation, the memory device 200 may adjust the read voltage based on the target operation parameters of the target operation parameter set.

Figure 2:
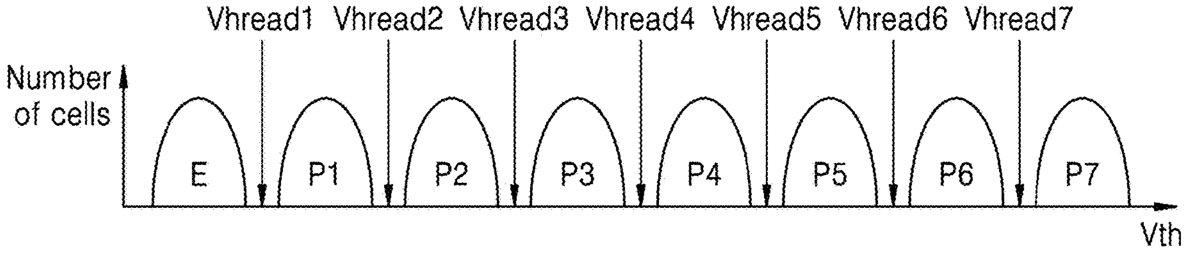
FIG. 2 is a graph illustrating a threshold voltage distribution of a desired triple-level cell (TLC)

FIG. 2 is a graph illustrating a threshold voltage distribution of a desired triple-level cell (TLC). In the graph of FIG. 2, the horizontal axis may represent a magnitude of a threshold voltage, and the vertical axis may represent the number of memory cells. The same description as that made above will be omitted.

Referring to FIG. 2, when a memory device (e.g., the memory device 200 of FIG. 1) is a triple-level cell (TLC) memory device including a memory cell array and capable of storing three bits in one memory cell in the memory cell array, in order to program three bits to one memory cell, a threshold voltage of the memory cell may be programmed to one of eight threshold voltages. However, the TLC memory device is only an example, and inventive concepts are not limited thereto. Because there is a difference in electrical characteristics between memory cells programmed to have the same threshold voltage, threshold voltages of a plurality of memory cells programmed to have the same threshold voltage may form a threshold voltage distribution. Accordingly, in the case of the TLC memory device, eight threshold voltage distributions E (erase) and P1 to P7 may be formed.

When a threshold voltage distribution of a memory cell array is in an ideal state as shown in FIG. 2, read data with few errors may be obtained by performing a read operation by using read voltages Vhread1 to Vhread7. A read operation using the read voltages Vhread1 to Vhread7 may mean, when the read voltages Vhread1 to Vhread7 are supplied to a word line of a memory cell, reading data stored in the memory cell as 1 or 0 according to an on-state or an off-state of the memory cell. Each of the read voltages Vhread1 to Vhread7 may be evenly spaced amongst each other; however, example embodiments are not limited thereto.

Operational characteristics of memory cells may vary according to a situation of a memory device. For example, a read voltage having the same level is applied to a word line to read memory cells having the same threshold voltage, and a read operation result of a memory device may vary according to a situation of the memory device. Such a change in operational characteristics may affect a read operation result of the memory device, and a threshold voltage distribution may deteriorate as an operation on a memory cell array is repeated.

Figure 3:
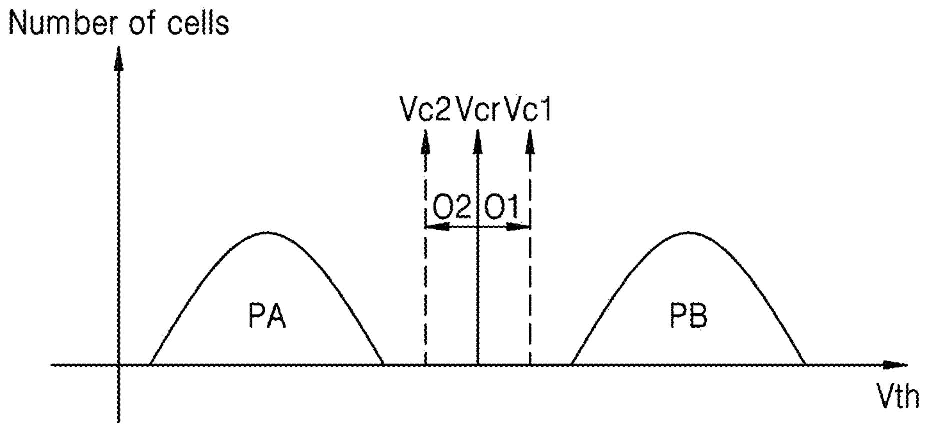
FIG. 3 is a graph for describing a read voltage compensated according to a current situation of a memory device.

FIG. 3 is a graph for describing a read voltage compensated or adjusted according to a current situation of a memory device. In the graph of FIG. 3, the horizontal axis represents a magnitude of a threshold voltage, and the vertical axis represents the number of memory cells. The same description as that made above will be omitted.

FIG. 3 illustrates two arbitrary threshold voltage distributions PA and PB adjacent to each other and a read voltage Vcr for distinguishing between the threshold voltage distributions PA and PB. For example, it is assumed that a first situation is a case where a temperature of a memory device is higher than a reference temperature. In the first situation, when the temperature of the memory device is higher than the reference temperature, a larger amount of current may flow through a bit line, and memory cells having threshold voltages higher than the read voltage Vcr may be incorrectly read as on-cells.

During a read operation, operation parameters may be first and second offsets O1 and O2, and the read voltage Vcr may be adjusted based on the operation parameters. For example, the first offset O1 may be reflected in the read voltage Vcr to generate a read voltage Vc1. When it is assumed that a current situation of the memory device is the first situation, operational characteristics of the memory device in the first situation may be compensated for by applying the read voltage Vc1.

It is assumed that a second situation is a case where a temperature of the memory device is lower than a reference voltage. In the second situation, when the temperature of the memory device is lower than the reference temperature, a smaller amount of current may flow through a bit line, and memory cells having threshold voltages lower than the read voltage Vcr may be incorrectly read as off-cells. For example, the second offset O2 may be reflected in the read voltage Vcr to generate a read voltage Vc2. When it is assumed that a current situation of the memory device is the second situation, operational characteristics of the memory device in the second situation may be compensated for by applying the read voltage Vc2.

According to various example embodiments, operational characteristics of a memory device may be compensated for or adjusted based on operation parameters. A memory controller may determine a current situation of the memory device and may transmit operation parameters corresponding to the current situation to the memory device to compensate for or to adjust operational characteristics for the current situation. When there is an index previously assigned to an operation parameter set including the operation parameters corresponding to the current situation, the memory controller may transmit the index to the memory device, which may take less time than transmitting the operation parameter set to the memory device. In some examples, when the index is transmitted, the memory device may more rapidly obtain the operation parameter set corresponding to the current situation of the memory device by using an offset table stored in the memory device, and operational characteristics of the memory device may be efficiently compensated.

Figure 4:
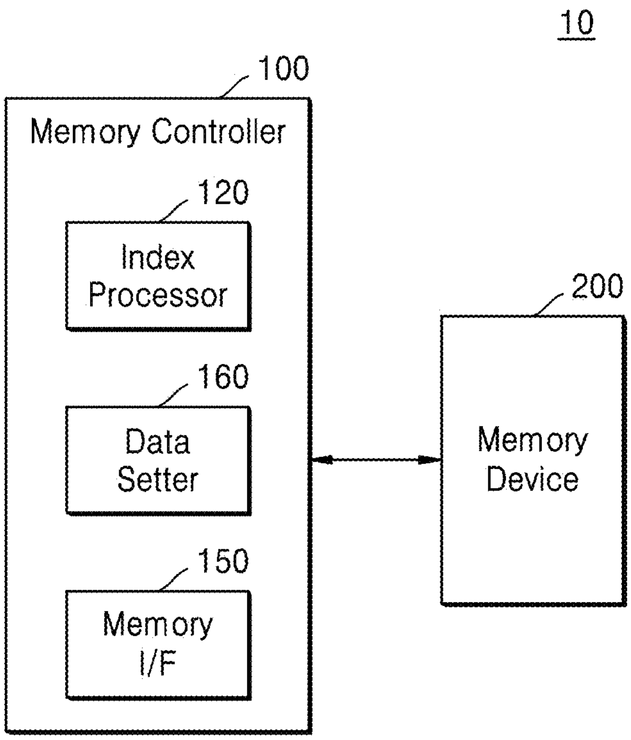
FIG. 4 is a block diagram for describing a memory controller, according to various example embodiments.

FIG. 4 is a block diagram for describing a memory controller, according to various example embodiments. The memory device 200, the memory controller 100, the index processor 120, and the memory interface 150 of FIG. 4 respectively correspond to the memory device 200, the memory controller 100, the index processor 120, and the memory interface 150, and thus, a repeated description thereof will be omitted.

Referring to FIG. 4, the memory controller 100 may include the index processor 120, a data setter 160, and the memory interface 150. The index processor 120 may generate operation parameter sets respectively corresponding to a plurality of situations of the memory device 200. The index processor 120 may generate sample operation parameter sets by extracting some of the operation parameter sets respectively corresponding to the plurality of situations. The index processor 120 may respectively assign indices to the sample operation parameter sets. The index processor 120 may transmit the sample operation parameter sets and the indices respectively assigned to the sample operation parameter sets to be stored as an offset table of the memory device 200. A method of generating an offset table will be described below in detail with reference to FIG. 5.

Any or all of the elements described with reference to FIG. 4 may communicate with any or all other elements described with reference to FIG. 4. For example, any element may engage in one-way and/or two-way and/or broadcast communication with any or all other elements in FIG. 1, to transfer and/or exchange and/or receive information such as but not limited to data and/or commands, in a manner such as in a serial and/or parallel manner, via a bus such as a wireless and/or a wired bus (not illustrated). The information may be in encoded various formats, such as in an analog format and/or in a digital format.

The following will be described assuming that a memory operation is a read operation. However, inventive concepts are not limited thereto. In an initialization period, the index processor 120 may control the memory device 200 to store an offset table, and in a read period, the index processor 120 may determine whether there is a target index assigned to a target operation parameter set.

The index processor 120 may generate a target operation parameter set corresponding to a current situation of the memory device 200 and may determine whether there is a target index assigned to the target operation parameter set. The term "target operation parameter set" may refer to an operation parameter set corresponding to a current situation, and the term "target index" may refer to an index assigned to the target operation parameter set. The index processor 120 may determine whether a target operation parameter set is matched to one of the generated sample operation parameter sets and there is a target index assigned to the target operation parameter set.

The index processor 120 may transmit one of the target index and the target operation parameter set to the memory device 200 through the memory interface 150 based on whether there is the target index assigned to the target operation parameter set. In detail, the index processor 120 may transmit one of the target index and the target operation parameter set to the data setter 160, and the data setter 160 may set an operation command, an address, and operation data transmitted to the memory device 200 and may transmit them to the memory interface 150.

When there is the target index assigned to the target operation parameter set, the index processor 120 may transmit the target index to the data setter 160. When the target operation parameter set is matched to one of the sample operation parameter sets and there is the target index assigned to the target operation parameter set, the index processor 120 may transmit the target index as operation data to the data setter 160.

When there is no target index assigned to the target operation parameter set, the index processor 120 may transmit the target operation parameter set to the data setter 160. When the target operation parameter set is not matched to one of the sample operation parameter sets and there is no target index assigned to the target operation parameter set, the index processor 120 may transmit the target operation parameter set as operation data to the data setter 160.

In various example embodiments, a data amount of the target index transmitted by the memory controller 100 to the memory device 200 may be less than a data amount of the target operation parameter set transmitted by the memory controller 100 to the memory device 200. For example, a data amount of the target index may be 1 byte, and a data amount of the target operation parameter set may be 4 bytes. However, data amounts of the target index and the target operation parameter set are not limited to the above example.

In various example embodiments, the index processor 120 may generate a different operation command according to a type of operation data transmitted to the memory device 200. The index processor 120 may generate a first operation command when an index is transmitted as operation data and may generate a second operation command when an operation parameter set is transmitted as operation data. During a read operation, when there is the target index assigned to the target operation parameter set, the index processor 120 may transmit a first read command and the target index to the data setter 160. When there is no target index assigned to the target operation parameter set, the index processor 120 may transmit a second read command and the target operation parameter set to the data setter 160.

The data setter 160 may set data to be transmitted to the memory device 200. The data setter 160 may set pieces of data to be transmitted to the memory device 200 in a specific order. For example, when the data setter receives the target index, the data setter 160 may set the memory interface 150 to sequentially (and/or in parallel) transmit the first read command, an address indicating a location where a memory operation for the first read command is to be performed, and the target index in the listed order. When the data setter 160 receives the target operation parameter set, the data setter 160 may set the memory interface 150 to sequentially (and/or in parallel) transmit the second read command, an address indicating a location where a memory operation for the second read command is to be performed, and the target operation parameter set in the listed order.

The memory interface 150 may transmit one of or both of the target index and the target operation parameter set to the memory device 200. The memory interface 150 may transmit a data signal to the memory device 200 and/or may receive a data signal from the memory device 200. The memory interface 150 may transmit the first read command, the address, and the target index to the memory device 200 through the data signal. The memory interface 150 may transmit the second read command, the address, and the target operation parameter set to the memory device 200 through the data signal. For example, the memory interface 150 may transmit/receive data through a DQ pin.

Figure 5:
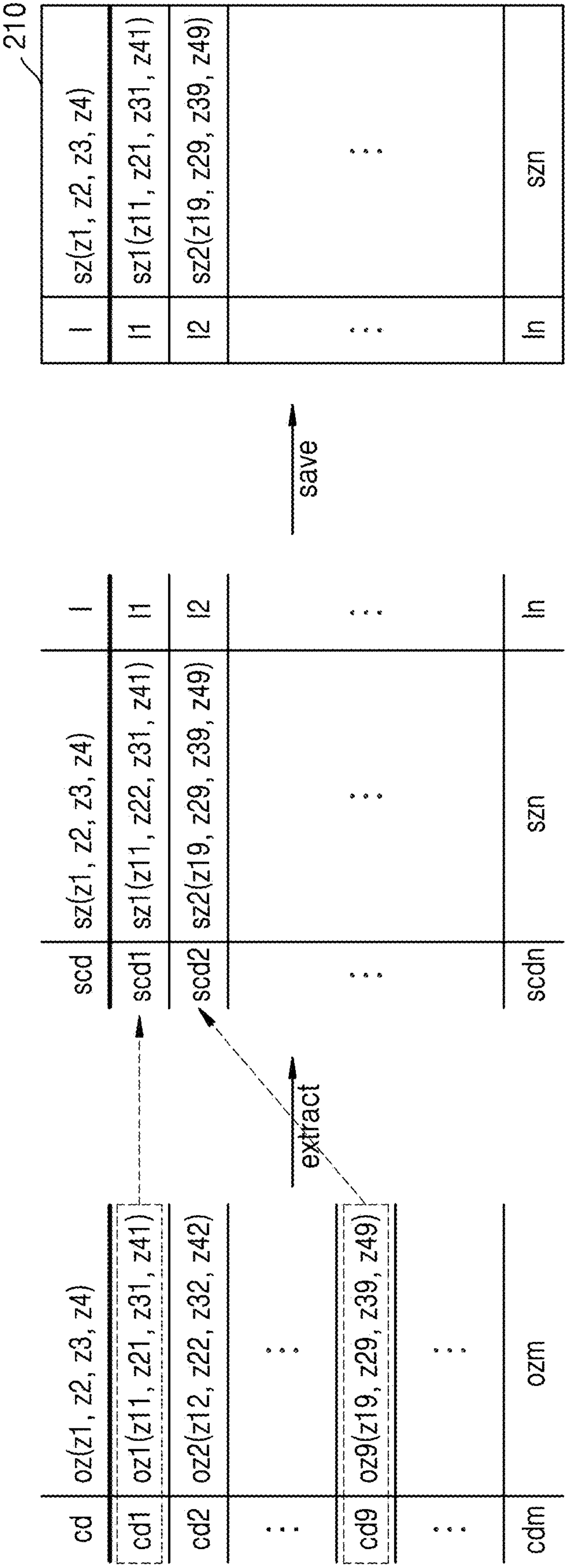
FIG. 5 is a diagram for describing an offset table, according to various example embodiments.

FIG. 5 is a diagram for describing an offset table, according to various example embodiments. In FIG. 5, sample operation parameter sets sz are extracted from operation parameter sets oz and the offset table 210 is generated according to the sample operation parameter sets sz. The same description as that made above will be omitted.

A memory controller (e.g., the memory controller 100 of FIG. 1) may generate the operation parameter sets oz respectively corresponding to a plurality of situations cd of a memory device (e.g., the memory device 200 of FIG. 1) The plurality of situations cd of the memory device may include or be based on one or more of state conditions such as a temperature condition, a program time condition, and an erase count of the memory device, or a combination thereof. The plurality of situations cd may include each of the state conditions and a combination of the state conditions. The plurality of situations cd may include m (m is a positive number) situations (e.g., first to $m^{th}$ situations cd1 to cdm). For example, the first situation cd1 and the second situation cd2 may be different from each other in one or more of the temperature condition, the program time condition, and the erase count of the memory device or two or more situations may be different.

The memory controller may generate the operation parameter sets oz respectively corresponding to the plurality of situations cd to compensate for operational characteristics of the memory device in each of the plurality of situations cd of the memory device. An operation parameter set may be a set of operation parameters Z1 to Z4 for compensating for operational characteristics of the memory device in a specific situation. For example, in the case of a read operation, an operation parameter may include an offset level of a read voltage. For example, the memory controller may generate a first operation parameter set oz1 corresponding to a first situation cd1, and the first operation parameter set oz1 may include a first operation parameter z11, a second operation parameter z21, a third operation parameter z31, and a fourth operation parameter z41. The memory controller may generate a second operation parameter set oz2 corresponding to a second situation cd, and the second operation parameter set oz2 may include a first operation parameter z12, a second operation parameter z22, a third operation parameter z32, and a fourth operation parameter z42. However, inventive concepts are not limited thereto, and one operation parameter set may include various numbers of operation parameters.

In various example embodiments, the memory controller may generate the sample operation parameter sets sz by extracting some of the operation parameter sets oz respectively corresponding to the plurality of situations cd. The memory controller may extract sample situations scd from among the plurality of situations cd. The sample situations scd may include n (n is a positive number or positive integer less than m) situations (e.g., first to $n^{th}$ situations scd1 to scdn).

The memory controller may extract relatively frequently occurring situations from among the plurality of situations cd as the sample situations scd. For example, the memory controller may extract the sample operation parameter sets sz based on a use frequency of an operation parameter set. For example, the memory controller may extract the operation parameter sets oz having a specific use frequency or more use frequency from among the operation parameter sets oz as the sample operation parameter sets sz. The first situation cd1 and the ninth situation cd9 may be extracted as sample situations. The first situation cd1 may be a first sample situation scd1, and the first operation parameter set oz1 may be a first sample operation parameter set sz1. The ninth situation cd9 may be a second sample situation scd2, and a ninth operation parameter set oz9 may be a second sample operation parameter set sz2.

In various example embodiments, the memory controller may assign an index I to each of the sample operation parameter sets sz. For example, the memory controller may assign a first index I1 to the first sample operation parameter set sz1 corresponding to the first sample situation scd1. The memory controller may assign a second index I2 to the second sample operation parameter set corresponding to the second sample situation scd2. The memory controller may transmit the sample operation parameter sets sz and the indices I to the memory device to be stored as the offset table 210 included in the memory device.

The memory device may receive the sample operation parameter sets sz respectively corresponding to the sample situations scd and the indices I respectively assigned to the sample operation parameter sets sz and may generate the offset table 210 including mapping information between the indices I and the sample operation parameter sets sz. The offset table 210 may include the indices I and the sample operation parameter sets sz corresponding to the indices I. For example, the first index I1 may be mapped to the first sample operation parameter set sz1, and the second index I2 may be mapped to the second sample operation parameter set sz2. For example, the offset table 210 may be stored in a register of the memory device.

For example, a method of generating the offset table 210 of FIG. 5 may be performed in an initialization period. However, inventive concepts are not limited thereto, and a method of generating the offset table 210 may be performed after the initialization period, or may be flexibly performed in and after the initialization period. For example, the offset table 210 may be generated in an initialization period, and may be updated or changed based on sample operation parameters and indices generated in a read period.

Figure 6:
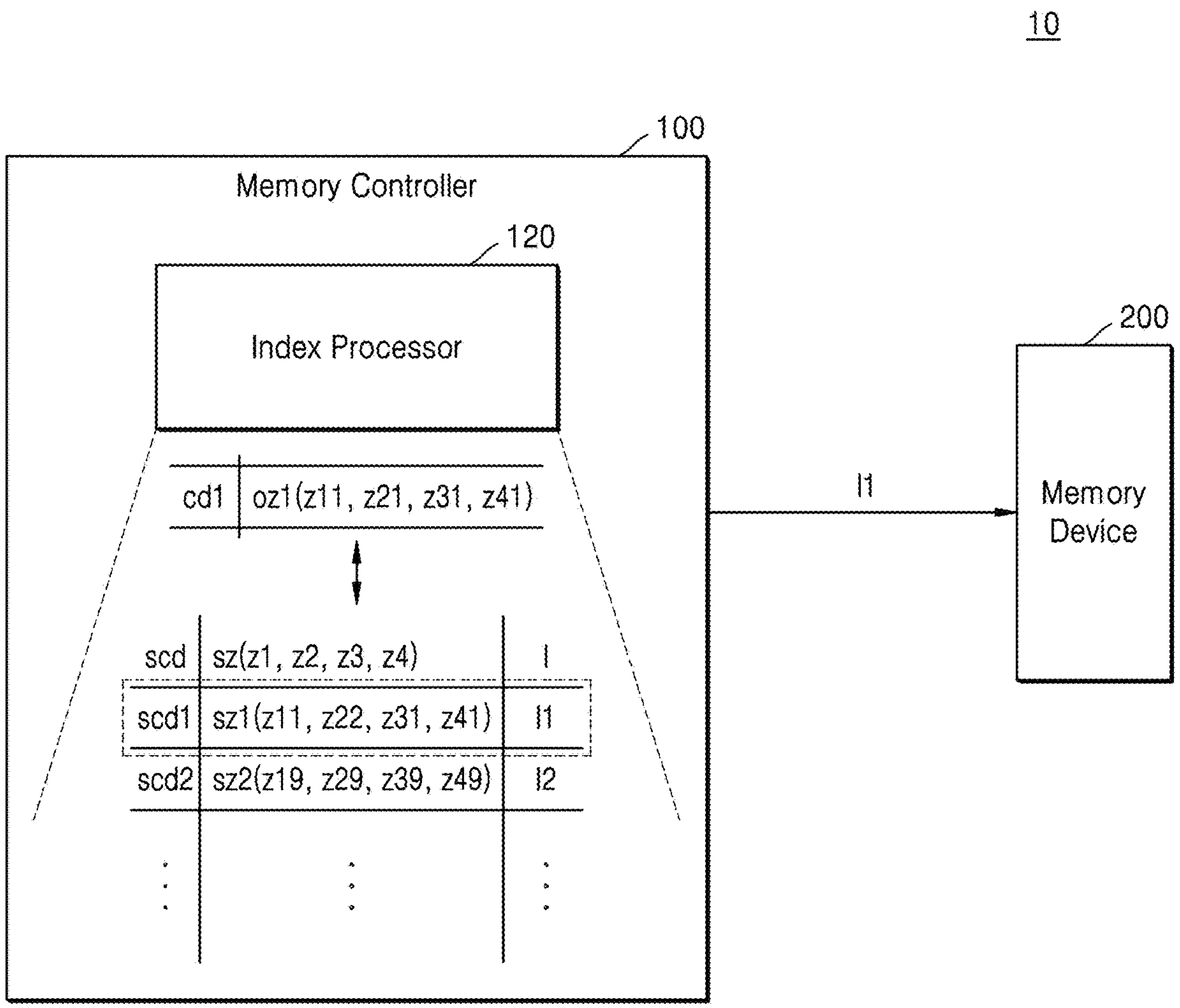
FIG. 6 is a diagram for describing a case where a target index is assigned, according to various example embodiments.

FIG. 6 is a diagram for describing a case where a target index is assigned, according to various example embodiments. In FIG. 6, it is assumed that there is a target index assigned to a target operation parameter set. A method of determining whether there is a target index, described with reference to FIG. 6, may be performed in a read period during a read operation. The same description as that made above will be omitted.

The index processor 120 may generate a target operation parameter set corresponding to a current situation of the memory device 200. An operation parameter set corresponding to a current situation may be a target operation parameter set. For example, the index processor 120 may determine a current situation as the first situation cd1 and may generate the first operation parameter set oz1 corresponding to the first situation cd1. The first operation parameter set oz1 may be a target operation parameter set.

The index processor 120 may determine whether there is a target index assigned to the target operation parameter set. The index processor 120 may store the sample operation parameter sets sz and the indices I. For example, the index processor 120 may store the sample operation parameter sets sz and the indices I that are generated in an initialization period. The index processor 120 may determine whether the target operation parameter set is matched to one of the sample operation parameter sets sz and there is the target index assigned to the target operation parameter set. For example, the index processor 120 may determine that the first situation cd1 corresponds to the first sample situation scd1, the first operation parameter set oz1 is matched to a first sample operation parameter set, and there is an index assigned to the first operation parameter et oz1. The index assigned to the first operation parameter set oz1 may be the first index I1.

The index processor 120 may transmit the first index I1 to the memory device 200. In various example embodiments, the memory controller 100 may transmit the target index to the memory device 200 for a first clock cycle. For example, the first clock cycle may be one clock cycle, and the memory controller 100 may transmit the first index I1 to the memory device 200 for one clock cycle.

Figure 7:
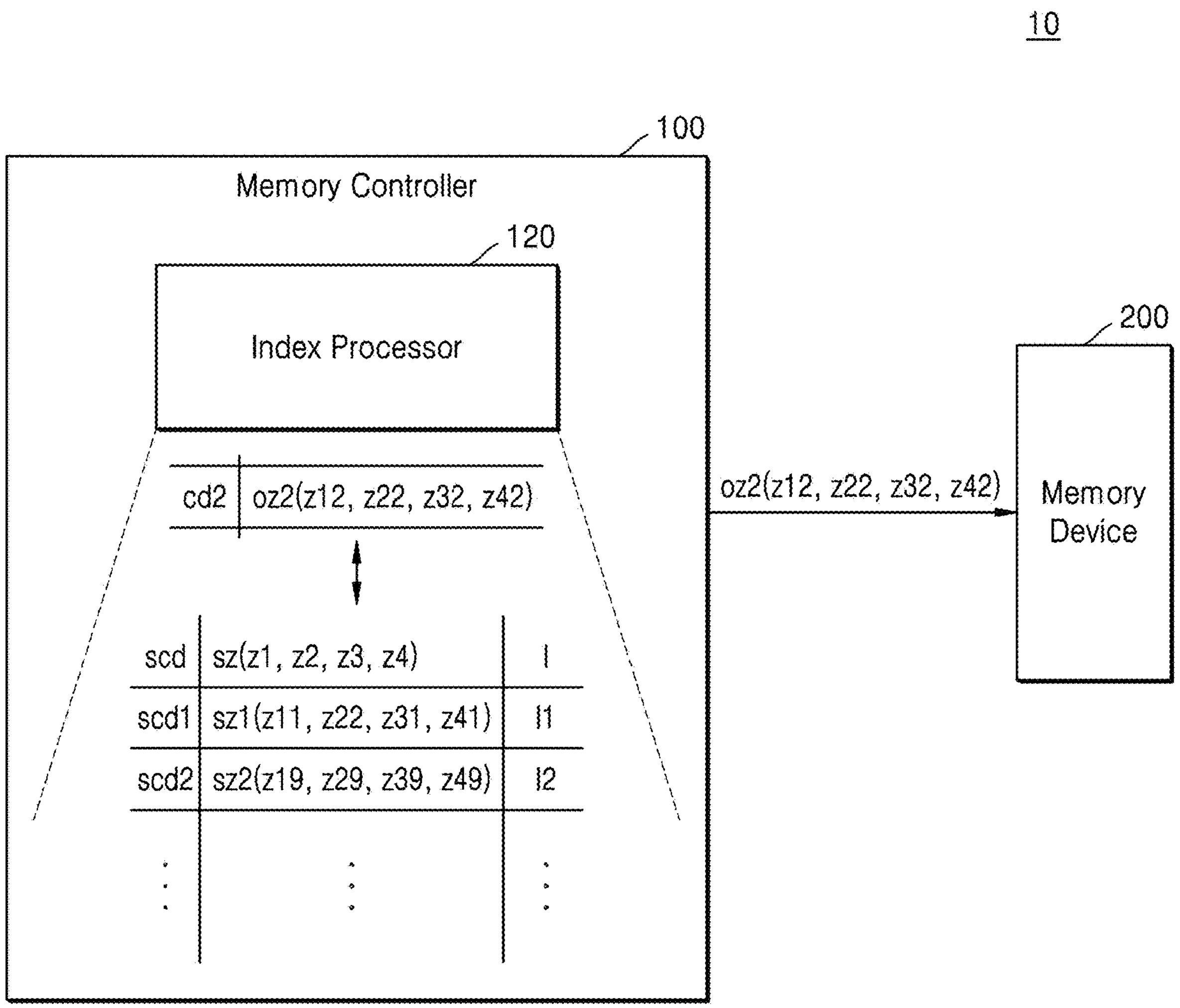
FIG. 7 is a diagram for describing a case where a target index is not assigned, according to various example embodiments.

FIG. 7 is a diagram for describing a case where a target index is not assigned, according to various example embodiments. In FIG. 7, it is assumed that there is no target index assigned to a target operation parameter set. A method of determining whether there is a target index, described with reference to FIG. 7, may be performed in a read period during a read operation. The same description as that made with reference to FIG. 6 will be omitted.

The index processor 120 may determine a current situation as the second situation cd2 and may generate the second operation parameter set oz2 corresponding to the second situation cd2. The second operation parameter set oz2 may be a target operation parameter set. The index processor 120 may determine that there is no sample operation parameter set sz matched to the second operation parameter set oz2 and there is no index assigned to the second operation parameter set oz2.

The index processor 120 may transmit the second operation parameter set oz2 to the memory device 200. In various example embodiments, the memory controller 100 may transmit a target operation parameter set to the memory device 200 for a second clock cycle. A second clock cycle number may be greater than a first clock cycle number. The target operation parameter set may have a larger data amount than a target index. The target operation parameter set may be transmitted to the memory device 200 for more clock cycles than the target index. For example, the second clock cycle may be four clock cycles, and the memory controller 100 may transmit the second operation parameter set oz2 to the memory device 200 for four clock cycles. The memory controller 100 may transmit the first operation parameter z12, the second operation parameter z22, the third operation parameter z32, and the fourth operation parameter z42 included in the second operation parameter set oz2 to the memory device 200 for four clock cycles. When there is the target index assigned to the target operation parameter set, the memory controller 100 may transmit the target index to the memory device 200, thereby reducing a time taken to transmit data.

Figure 8:
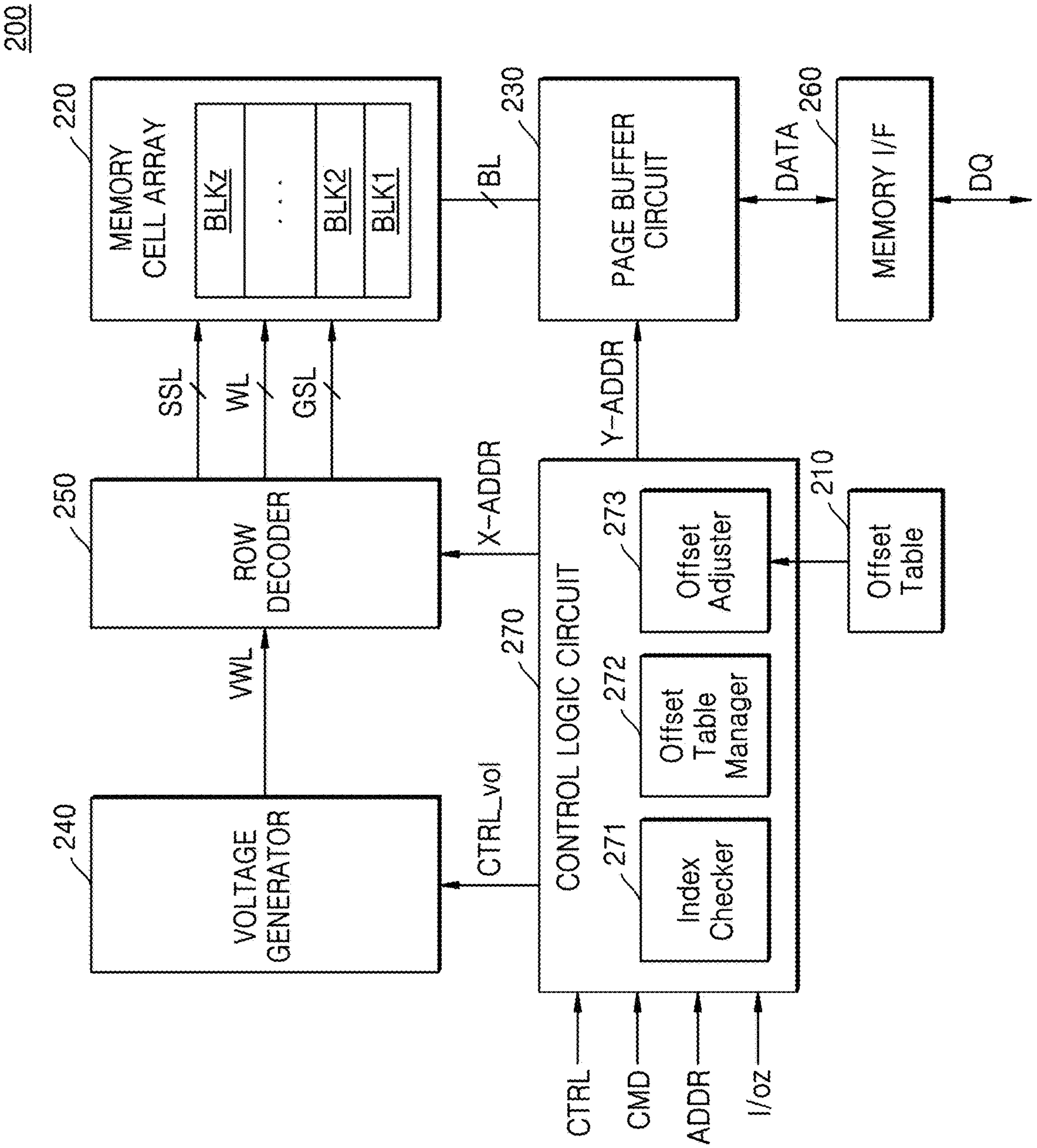
FIG. 8 is a block diagram for describing a memory device, according to various example embodiments.

FIG. 8 is a block diagram for describing a memory device, according to various example embodiments. The memory device 200 of FIG. 8 may be or may include a nonvolatile memory and corresponds to the memory device 200 of FIG. 1, and thus, a repeated description thereof will be omitted.

Referring to FIG. 8, the memory device 200 may include the offset table 210, a control logic circuit 270, a memory cell array 220, a page buffer circuit 230, a voltage generator 240, a row decoder 250, and a memory interface 260. Although not shown in FIG. 8, the memory device 200 may further include one or more of a redundancy checking circuit, a column logic, a pre-decoder, a temperature sensor, a command decoder, and an address decoder.

The memory device 200 may include the offset table 210. For example, the offset table 210 may be stored in a register included in the memory device 200. However, inventive concepts are not limited thereto. The offset table 210 may include mapping information between sample operation parameter sets respectively corresponding to sample situations of the memory device 200 and indices respectively assigned to the sample operation parameter sets. For example, during a read operation, the offset table 210 may be stored in an initialization period. Although the offset table 210 is stored in the initialization period for convenience of explanation, the offset table 210 may be stored in the same or similar manner even after the initialization period.

The control logic circuit 270 may generally control various operations in the memory device 200. The control logic circuit 270 may output various control signals in response to a command CMD and/or an address ADDR from the memory interface 260. For example, the control logic circuit 270 may output one or more of a voltage control signal CTRL_vol, a row address X-ADDR, and a column address Y-ADDR.

The memory cell array 220 may include a plurality of memory blocks BLK1 to BLKz (z is a positive integer), and each of the plurality of memory blocks BLK1 to BLKz may include a plurality of memory cells. The memory cell array 220 may be connected to the page buffer circuit 230 through bit lines BL and may be connected to the row decoder 250 through word lines WL, string selection lines SSL, and ground selection lines GSL. The number of memory cell arrays included in the memory device 200 is not limited thereto. In some example embodiments, the memory cell array 220 may include redundant memory cells; example embodiments are not limited thereto.

In various example embodiments, the memory cell array 220 may include a three-dimensional (3D) memory cell array, and the 3D memory cell array may include a plurality of NAND strings. Each NAND string may include memory cells connected to word lines that are vertically stacked on a substrate. In various example embodiments, the memory cell array 20 may include a two-dimensional (2D) memory cell array, and the 2D memory cell array may include a plurality of NAND strings arranged in row and column directions.

The page buffer circuit 230 may include a plurality of page buffers, and the plurality of page buffers may be respectively connected to the memory cells through a plurality of bit lines BL. The page buffer circuit 230 may select at least one bit line from among the bit lines BL in response to the column address Y-ADDR. The page buffer circuit 230 may operate as a write driver or a sense amplifier according to an operation mode. For example, during a write operation, the page buffer circuit 230 may apply a bit line voltage corresponding to data to be programmed to the selected bit line. During a read operation, the page buffer circuit 230 may detect data stored in a memory cell by detecting current or a voltage of the selected bit line.

The voltage generator 240 may generate various types of voltages for performing program, read, and erase operations based on the voltage control signal CTRL_vol. For example, the voltage generator 240 may generate one or more of a program voltage, a read voltage, a program verification voltage, or an erase voltage as a word line voltage VWL. During a read operation, the voltage generator 240 may generate a read voltage under the control of the control logic circuit 270 and may provide the read voltage to the row decoder 250.

The row decoder 250 may select one of a plurality of word lines WL and may select one of a plurality of string selection lines SSL in response to the row address X-ADDR. For example, the row decoder 250 may apply a program voltage and a program verification voltage to a selected word line during a program operation, and may apply a read voltage to the selected word line during a read operation.

The memory interface 260 may transmit/receive data through a DQ pin.

The control logic circuit 270 may receive one of the index I and the operation parameter set oz through the DQ pin through the memory interface 260. As described herein, the DQ pin may be referred to as an I/O pin. The index I received in a read period may be a target index, and the operation parameter set oz may be a target operation parameter set. The following will be described assuming that the control logic circuit 270 receives the target index I or the target operation parameter set oz.

The control logic circuit 270 may include an index checker 271, an offset table manager 272, and an offset adjuster 273. The control logic circuit 270 may compensate for operational characteristics of the memory device 200 based on the offset table 210. The index checker 271 may check whether operation data received from a memory controller (e.g., the memory controller 100 of FIG. 1) is the target index I, or is the target operation parameter set oz.

In various example embodiments, the index checker 271 may identify operation data based on a command type. When a first read command is received, the index checker 271 may determine that the received operation data is the target index I. When a second read command is received, the index checker 271 may determine that the received operation data is the target operation parameter set oz.

In various example embodiments, the index checker 271 may receive a command, an address, and operation data from the memory controller and may identify the operation data as one of the target index I and the target operation parameter set oz based on the number of the received operation data. When the operation data is the target index I, the number of pieces of data may be less than that when the operation data is the target operation parameter set oz. A data amount of the target index I may be less than a data amount of the target operation parameter set oz.

When the number of received of operation data is a first number, the index checker 271 may identify the operation data as the target index I, and when the number of received operation data is a second number, the index checker 271 may identify the operation data as the target operation parameter set oz. The second number may be greater than the first number. For example, when one operation data is received for one clock cycle, the index checker 271 may determine that the target index I has been received, and when four pieces of operation data are received for four clock cycles, the index checker 271 may determine that the target operation parameter set oz has been received.

The offset table manager 272 may manage the offset table 210. In an initialization period, the offset table manager 272 may store sample operation parameter sets and indices received from the memory controller as the offset table 210. In a read period, when the offset table manager 272 receives the target index I from the memory controller, the offset table manager 272 may obtain an operation parameter set corresponding to the target index I by using the offset table 210. The offset table manager 272 may obtain the target operation parameter set oz mapped to the target index I by using the offset table 210.

The offset adjuster 273 may adjust a read voltage based on the target operation parameter set oz. The offset adjuster 273 may adjust a level of a voltage offset added to/subtracted from the read voltage to compensate for operational characteristics of the memory device 200. During a read operation, the offset adjuster 273 may determine a level of the read voltage based on the level of the voltage offset included in the target operation parameter set oz, and may output the voltage control signal CTRL_vol so that the voltage generator 240 generates the read voltage at the determined level.

When the target operation parameter set oz is received from the memory controller, the offset adjuster 273 may receive the target operation parameter set oz from the index checker 271 and may determine a level of a read voltage. However, inventive concepts are not limited thereto, and the offset adjuster 273 may receive the target operation parameter set oz from the memory interface 260.

When the target index I is received from the memory controller, the offset adjuster 273 may receive the target operation parameter set oz output from the offset table 210 and may determine a level of a read voltage. Although the index checker 271, the offset table manager 272, and the offset adjuster 273 are included in the control logic circuit 270, example embodiments are not limited thereto. Each of the index checker 271, the offset table manager 272, and the offset adjuster 273 may be implemented as hardware separate from the control logic circuit 270.

Figure 9:
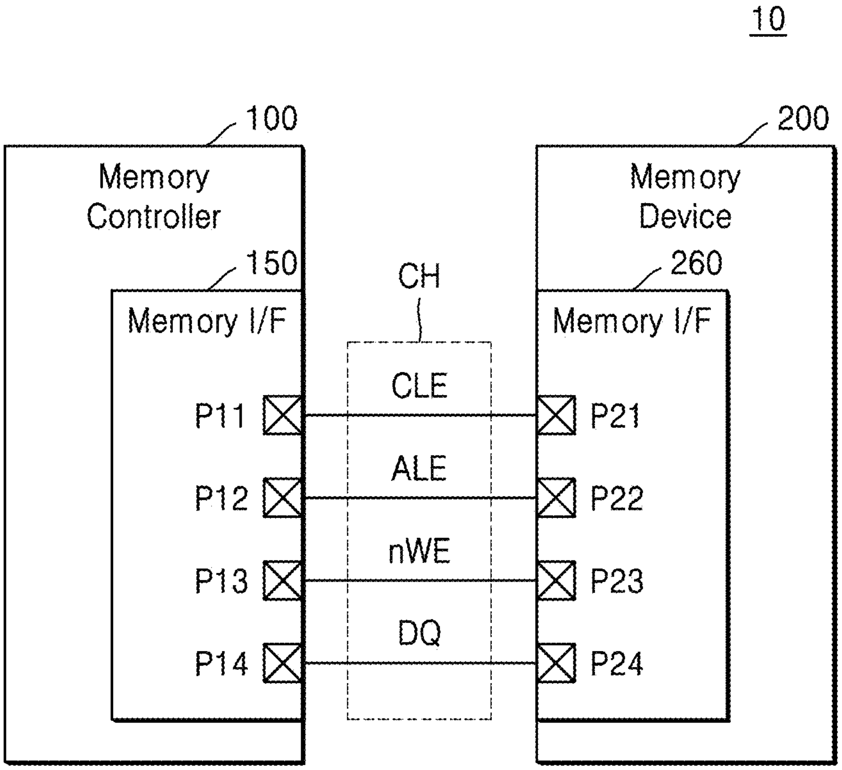
FIG. 9 is a diagram illustrating a memory system, according to various example embodiments.

FIG. 9 is a diagram illustrating a memory system, according to various example embodiments. FIG. 9 is a diagram for describing a channel CH that connects the memory controller 100 to the memory device 200. The memory system 10, the memory controller 100, and the memory device 200 of FIG. 9 may respectively correspond to the memory system 10, the memory controller 100, and the memory device 200 of FIG. 1.

Referring to FIG. 9, the memory system 10 may include the controller 100 and the memory device 200, and the memory device 200 may communicate with the memory controller 100 based on one channel CH.

The memory controller 100 may include $11^{th}$ to $14^{th}$ pins P11 to P14. The memory device 200 may include $21^{st}$ to $24^{th}$ pins P21 to P24. The $11^{th}$ to $14^{th}$ pins P11 to P14 and the $21^{st}$ to $24^{th}$ pins P21 to P24 may correspond to each other. The memory controller 100 and the memory device 200 may transmit and receive signals through the $11^{th}$ to $14^{th}$ pins P11 to P14 and the $21^{st}$ to $24^{th}$ pins P21 to P24.

The memory interface 150 may transmit a command latch enable (CLE) signal, an address latch enable (ALE) signal, and a write enable (nWE) signal to the memory device 200 through the $11^{th}$ to $13^{th}$ pins P11 to P13. The memory interface 150 may transmit a data signal DQ to the memory device 200 or may receive a data signal DQ from the memory device 200 through the $14^{th}$ pin P14.

The memory device 200 may receive the CLE signal, the ALE signal, and the nWE signal from the memory controller 100 through the $21^{st}$ to $23^{rd}$ pins P21 to P23. The memory controller 200 may receive the data signal DQ from the memory controller 100 or may transmit a data signal DQ to the memory controller 100 through the $24^{th}$ pin P24.

A command, an address, and data may be transmitted through the data signal DQ. For example, operation data may be transmitted from the memory controller 100 to the memory controller 200 through the data signal DQ. Read data may be transmitted from the memory device 200 to the memory controller 100 through the data signal DQ. The data signal DQ may be transmitted through a plurality of data signal lines. In this case, the $24^{th}$ pin P24 may include a plurality of pins corresponding to the plurality of data signal lines.

The memory device 200 may obtain a command from the data signal DQ received in an enable period (e.g., a high level state) of the CLE signal based on toggle timings of the nWE signal. The memory device 200 may obtain an address from the data signal DQ received in enable period (e.g., a high level state) of the ALE signal based on toggle timings of the nWE signal.

In various example embodiments, an nWE signal may be maintained in a fixed state (e.g., a high level or a low level) and then may be toggled between a high level and a low level. For example, the nWE signal may be toggled in a period in which a command or an address is transmitted. Accordingly, the memory device 200 may obtain the command and/or the address based on toggle timings of the nWE signal.

The memory controller 100 may transmit the data signal including the command and/or the address together with the nWE signal that is toggled to the memory device 200. As the memory controller 100 transmits the CLE signal having an enable state, the memory controller 100 may transmit the data signal DQ including the command to the memory device 200, and as the memory controller 100 transmits the ALE signal having an enable signal, the memory controller 100 may transmit the data signal DQ including the address to the memory device 200.

Figure 10A:
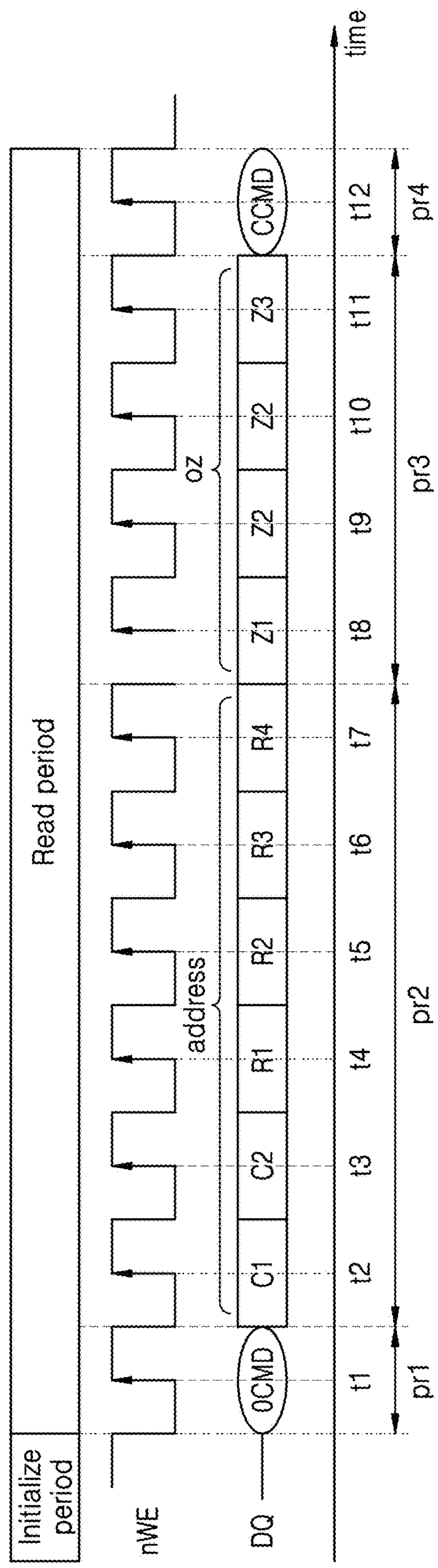
FIG. 10A illustrates a method of transmitting an operation parameter set, according to various example embodiments.

FIG. 10A illustrates a method of transmitting an operation parameter set, according to various example embodiments. The following will be described with reference to FIG. 9 and FIG. 10B together.

The memory controller 100 may provide the target operation parameter set oz together with an operation command OCMD and an address as the data signal DQ to the memory device 200. The memory controller 100 may transmit the data signal DQ including the operation command OCMD to the memory device 200. For example, the operation command OCMD may be one of a program command, a read command, and an erase command. The following will be described assuming that the operation command OCMD is a read command. A read period may include a first period pr1, a second period pr2, a third period pr3, and a fourth period pr4.

In the read period, the memory controller 100 may provide the target operation parameter set oz together with the operation command OCMD and the address as the data signal DQ to the memory device 200. The memory controller 100 may transmit the data signal DQ including the operation command OCMD to the memory device 200 in the first period pr1.

The memory controller 100 may transmit the data signal DQ including an actual address to the memory device 200 in the second period pr2. For example, the actual address may be transmitted over six clock cycles, and may include column addresses C1 and C2 and row addresses R1 to R4.

The memory controller 100 may transmit the data signal DQ including the target operation parameter set oz to the memory device 200 in the third period pr3. The target operation parameter set oz may include operation parameters Z1 to Z4. When there is no index assigned to the target operation parameter set oz, the memory controller 100 may transmit the target operation parameter set oz to the memory device 200. When the operation command OCMD is a read command, the operation parameters Z1 to Z4 may include an offset level of a read voltage.

For example, the target operation parameter set oz may be transmitted to the memory device 200 for a second clock cycle number. For example, the target operation parameter set oz may be transmitted over four clock cycles, and the operation parameters Z1 to Z4 may be transmitted.

The memory controller 100 may transmit the data signal DQ including a confirm command CCMD to the memory device 200 in the fourth period pr4. The confirm command CCMD may be a command for notifying the memory device 200 that all of the actual address and the operation parameters associated with the operation command OCMD have been transmitted.

The memory device 200 may obtain the operation command OCMD, the actual address (e.g., C1, C2, and R1 to R4), the target operation parameter set oz, and the confirmation command CCMD by sampling the data signal DQ at rising edges of the nWE signal. The operation command OCMD may include signal values of the data signal DQ at a first time point t1. The actual address (e.g., C1, C2, and R1 to R4) may include signal values of the data signal DQ at second to seventh time points t2 to t7. The target operation parameter set oz may include signal values of the data signal DQ at eighth to eleventh time points t8 to t11. The confirm command CCMD may include signal values of the data signal DQ at a $12^{th}$ time point t12.

When the memory device 200 obtains the confirm command CCMD, the memory device 200 may set an operation parameter of the operation command OCMD based on the received target operation parameter set oz and may perform an operation indicated by the operation command OCMD on the actual address (e.g., C1, C2, and R1 to R4). The memory controller 100 may compensate for operational characteristics of the memory device 200 by transmitting the target operation parameter set oz according to a current situation of the memory device 200.

Figure 10B:
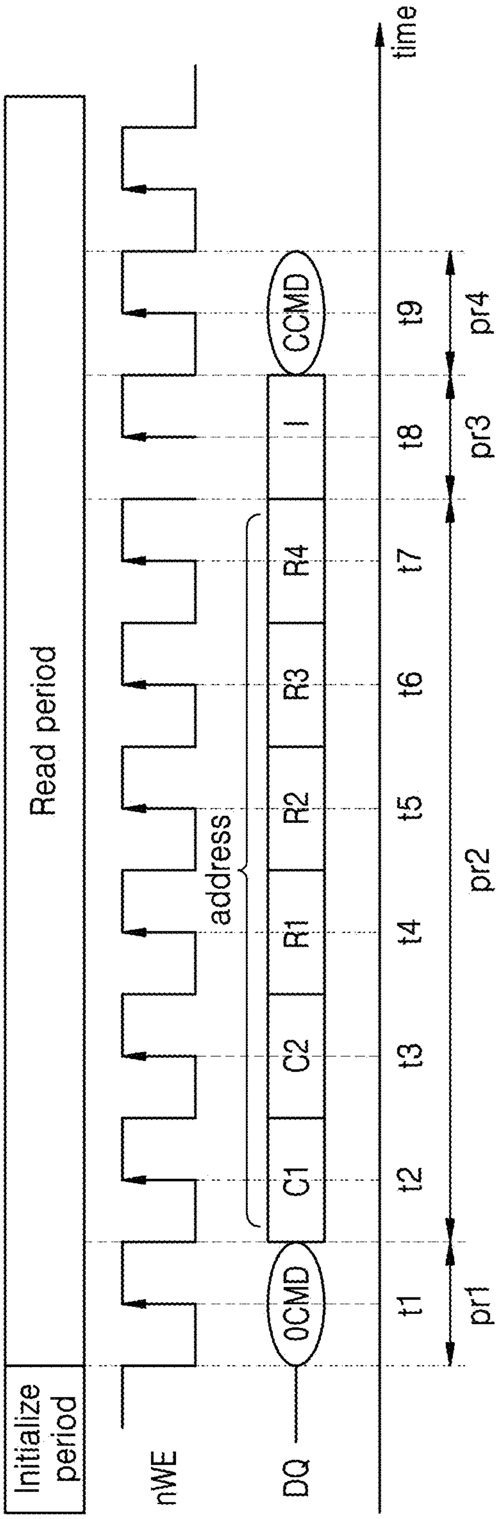
FIG. 10B illustrates a method of transmitting an index, according to various example embodiments.

FIG. 10B illustrates a method of transmitting an index, according to various example embodiments. The following will be described with reference to FIG. 9 and FIG. 10B together.

In a read period, the memory controller 100 may provide the target index I together with the operation command OCMD and the address as the data signal DQ to the memory device 200.

The memory controller 100 may transmit the data signal DQ including the target index I to the memory device 200 in the third period pr3. When the target index I assigned to the target operation parameter set, the memory controller 100 may transmit the target index I to the memory device 200. For example, the target index I may be transmitted to the memory device 200 for a first clock cycle number. For example, the target index I may be transmitted over one clock cycle. The first clock cycle number may be less than the second clock cycle number.

When there is the target index I assigned to the target operation parameter set, the target index I, instead of the target operation parameter set, may be transmitted over relatively few clock cycles to the memory device. For example, when the target index I is transmitted to the memory device 200, a time corresponding to three clock cycles may be reduced compared to when the target operation parameter set is transmitted to the memory device 200.

The memory device 200 may obtain the operation command OCMD, the actual address (e.g., C1, C2, and R1 to R4), the target index I, and the confirm command CCMD by sampling the data signal DQ at rising edges of the nWE signal. The target index I may include signal values of the data signal DQ at the eighth time point t8. The confirm command CCMD may include signal values of the data signal DQ at the ninth time point t9.

When the memory device 200 obtains the confirm command CCMD, the memory device 200 may obtain the target operation parameter set mapped to the target index I which was previously received based on an offset table, may set an operation parameter of the operation command OCMD based on the target operation parameter set, and may perform an operation indicated by the operation command COMD on the actual address (e.g., C1, C2, and R1 to R4).

Figure 11A:
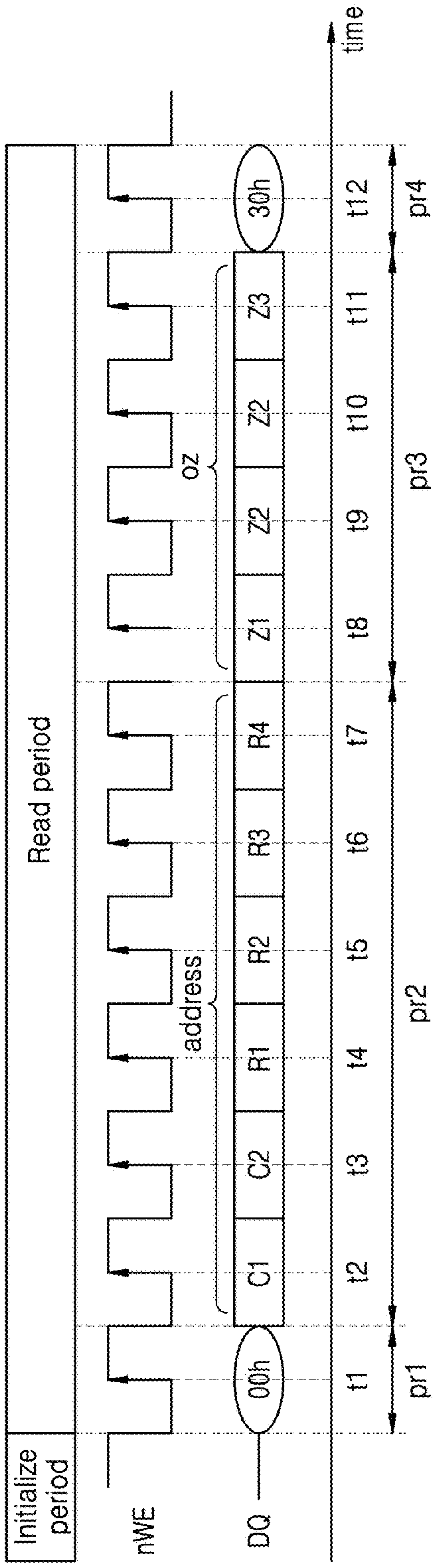
FIG. 11A illustrates a method of transmitting an operation parameter set during a read operation, according to various example embodiments.

FIG. 11A illustrates a method of transmitting an operation parameter set during a read operation, according to various example embodiments. FIG. 11A illustrates a case where the operation command OCMD of FIG. 10A is a read command 00h. The same description as that made in FIG. 10A will be omitted.

Referring to FIGS. 9 and 11A together, the memory controller 100 may provide the target operation parameter set oz together with the read command 00h and the address as the data signal DQ to the memory device 200. The memory controller 100 may transmit the data signal DQ including the read command 00h to the memory device 200 in the first period pr1. The memory controller 100 may transmit the data signal DQ including a confirm command 30h to the memory device 200 in the fourth period pr4.

The memory device 200 may obtain the read command 00h, the actual address (e.g., C1, C2, and R1 to R4), the target operation parameter set oz, and the confirm command 30h by sampling the data signal DQ at rising edges of the nWE signal. In various example embodiments, the memory device 200 may determine whether operation data is a target index or the target operation parameter set oz based on the number of pieces of operation data received by the memory device 200. The memory device 200 may determine whether operation data is the target index or the target operation parameter set oz based on the number of clock cycles in which the operation data received by the memory device 200 is received.

When the number of pieces of operation data received by the memory device 200 is a first number, the memory device 200 may determine that the operation data is the target index, and when the number of pieces of operation data received by the memory device 200 is a second number, the memory device 200 may determine that the operation data is the target operation parameter set oz. The second number may be greater than the first number. For example, the second number may be 4. Because the number pieces of operation data received by the memory device 200 by receiving the target operation parameter set oz for four clock cycles is 4, the memory device 200 may determine that the received operation data is the target operation parameter set oz. However, the second number is not limited thereto.

Figure 11B:
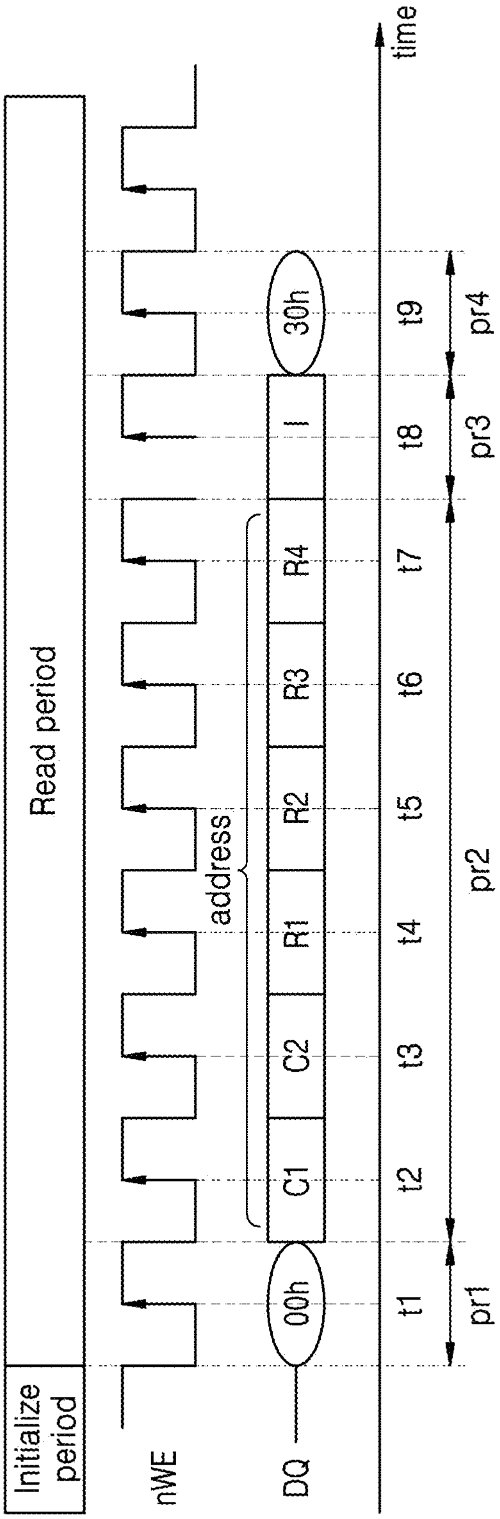
FIG. 11B illustrates a method of transmitting an index during a read operation, according to various example embodiments.

FIG. 11B illustrates a method of transmitting an index during a read operation, according to various example embodiments. FIG. 11B illustrates a case where the operation command OCMD of FIG. 10B is the read command 00h. In FIGS. 10B and 11A, the same description as that made above will be omitted.

Referring to FIGS. 9 and 11B together, the memory controller 100 may provide the target index I together with the read command 00h and the address as the data signal DQ to the memory device 200.

The memory device 200 may obtain the read command 00h, the actual address (e.g., C1, C2, and R1 to R4), the target index I, and the confirm command 30h by sampling the data signal DQ at rising edges of the nWE signal. When the number of pieces of operation data received by the memory device 200 is a first number, the memory device 200 may determine that the operation data is the target index, and when the number of pieces of operation data received by the memory device 200 is a second number, the memory device 200 may determine that the operation data is the target operation parameter set oz. For example, the first number may be 1, and the memory device 200 may receive the target index I for one clock cycle. Because the number of received operation data is 1, the memory device 200 may determine that the received operation data is the target index I. However, the first number is not limited thereto.

Figure 12:
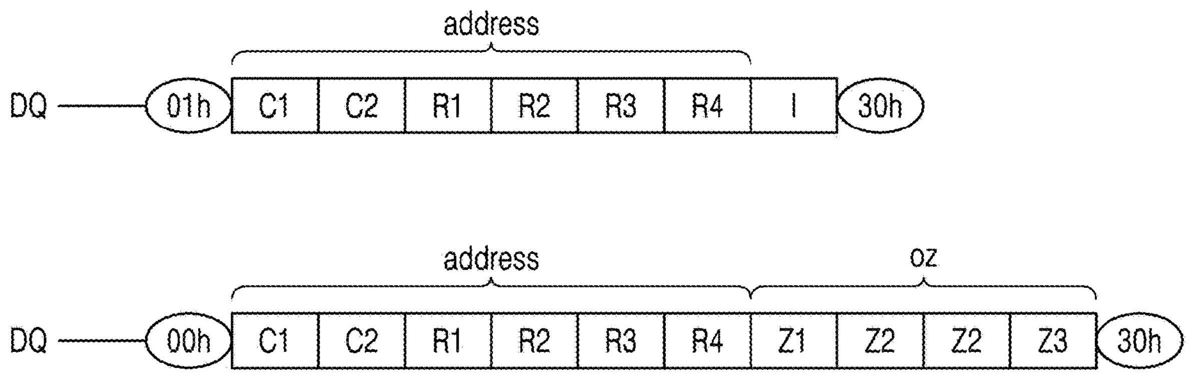
FIG. 12 is a diagram illustrating a method of transmitting a first read command and a second read command, according to various example embodiments.

FIG. 12 is a diagram illustrating a method of transmitting a first read command and a second read command, according to various example embodiments. The same description as that made above will be omitted.

Referring to FIGS. 9 and 12 together, the memory controller 100 may transmit a different read command according to operation data transmitted to the memory device 200. When there is the target index I assigned to the target operation parameter set oz, the memory controller 100 may generate a first read command 01h. The memory controller 100 may provide the target index I together with the first read command 01h and the address as the data signal DQ to the memory device 200.

When there is no target index I assigned to the target operation parameter set oz, the memory controller 100 may generate a second read command 00h. The memory controller 100 may provide the target operation parameter set oz together with the second read command 00h and the address as the data signal DQ to the memory device 200. The first read command 01h and the second read command 00h may be different from each other. However, inventive concepts are not limited thereto, and the memory controller 100 may transmit a different confirm command according to operation data transmitted to the memory device 200.

In various example embodiments, the memory device 200 may determine whether operation data is the target index I or the target operation parameter set oz based on a type of a read command. When the first read command 01h is received, the memory device 200 may determine that the operation data is the target index I. When the second read command 00h is received, the memory device 200 may determine that the operation data is the target operation parameter set oz.

Figure 13:
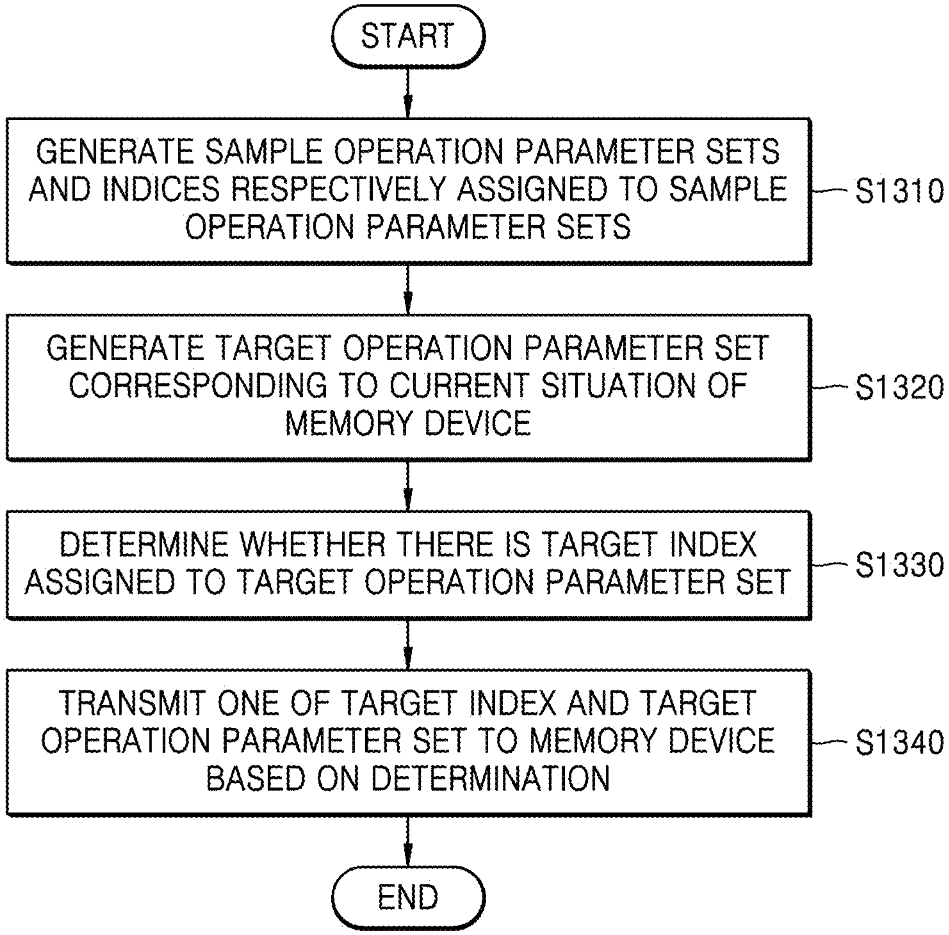
FIG. 13 is a flowchart illustrating an operating method of a memory controller, according to various example embodiments.

FIG. 13 is a flowchart illustrating an operating method of a memory controller, according to various example embodiments. The same description as that made above will be omitted.

In operation S1310, a memory controller may generate sample operation parameter sets and indices respectively assigned to the sample operation parameter sets. The memory controller may generate sample operation parameter sets and indices respectively assigned to the sample operation parameter sets to be stored as an offset table included in a memory device. For example, operation S1310 may be performed in an initialization period. The initialization period may precede a read period in which a read operation is performed. The term "initialization period" may refer to an initialization period of a memory system. For example, the memory controller may perform setting operations for performing a memory operation (e.g., a write operation or a read operation) on the memory device in the initialization period. However, inventive concepts are not limited thereto, and operation S1310 may be flexibly performed in and/or after the initialization period.

The memory controller may generate operation parameter sets respectively corresponding to a plurality of situations of the memory device. The plurality of situations of the memory device may include one of state conditions such as a temperature condition, a program time condition, and an erase count of the memory device, or a combination thereof. The memory controller may generate operation parameter sets respectively corresponding to a plurality of situations to compensate for operational characteristics of the memory device in each of the plurality of situations of the memory device.

The memory controller may generate sample operation parameter sets by extracting some from among the operation parameter sets respectively corresponding to the plurality of situations. The memory controller may extract relatively frequently occurring situations from among the plurality of situations as sample situations and may extract sample operation parameter sets. For example, the memory controller may extract sample operation parameter sets from among the operation parameter sets respectively corresponding to the plurality of situations based on a use frequency of an operation parameter set.

The memory controller may respectively assign indices to the sample operation parameter sets. The memory controller may transmit the sample operation parameter sets and the indices respectively assigned to the sample operation parameter sets to the memory device to be stored as an offset table of the memory device.

In operation S1320, the memory controller may generate a target operation parameter set corresponding to a current situation of the memory device. The term "target operation parameter set" may refer to an operation parameter set corresponding to a current situation, and the term "target index" may refer to an index assigned to the target operation parameter set. Operations S1320 to S1340 may be performed in a read period.

In operation S1330, the memory controller may determine whether the target operation parameter set is matched to one of the sample operation parameter sets and there is the target index assigned to the target operation parameter set. The memory controller may determine whether there is the target index assigned to the target operation parameter set.

The memory controller may check whether there is an operation parameter set matched to the target operation parameter set from among the generated sample operation parameter sets. When there is the target operation parameter set from among the sample operation parameter sets, an index may be assigned to the target operation parameter set. When a current situation of the memory device is one of frequently occurring sample situations from among the plurality of situations, there may be an index assigned to the target operation parameter set. When there is no target operation parameter set from among the sample operation parameter sets, there may be no index assigned to the target operation parameter set.

In operation S1340, the memory controller may transmit one of the target index and the target operation parameter set to the memory device based on the determination. The memory controller may transmit one of the target index and the target operation parameter set to the memory device through a memory interface.

When there is the target index assigned to the target operation parameter set, the memory controller may transmit the target index to the memory device. The memory device may obtain the target operation parameter set mapped to the received target index by using the offset table, and may compensate for a memory operation by using the target operation parameter set.

When there is no target index assigned to the target operation parameter set, the memory controller may transmit the target operation parameter set to the memory device. The memory device may compensate for a memory operation by using the target operation parameter set.

In various example embodiments, the memory controller may generate a different operation command according to a type of operation data transmitted to the memory device. The operation data may include an index and an operation parameter set. When the index is transmitted to the memory device, the memory controller may generate a first operation command, and when the operation parameter set is transmitted to the memory device, the memory controller may generate a second operation command.

The number of clock cycles in which the memory controller transmits the target index to the memory device may be different from the number of clock cycles in which the memory controller transmits the target operation parameter set. In various example embodiments, the memory controller may transmit the target index to the memory device for a first clock cycle. The memory controller may transmit the target operation parameter set to the memory device for a second clock cycle. A second clock cycle number may be greater than a first clock cycle number. When there is an assigned index, the memory controller may transmit the index with a relatively small data amount to the memory device, thereby reducing a time taken to transmit data to the memory device. Accordingly, an operating speed of the memory system may be improved.

Figure 14:
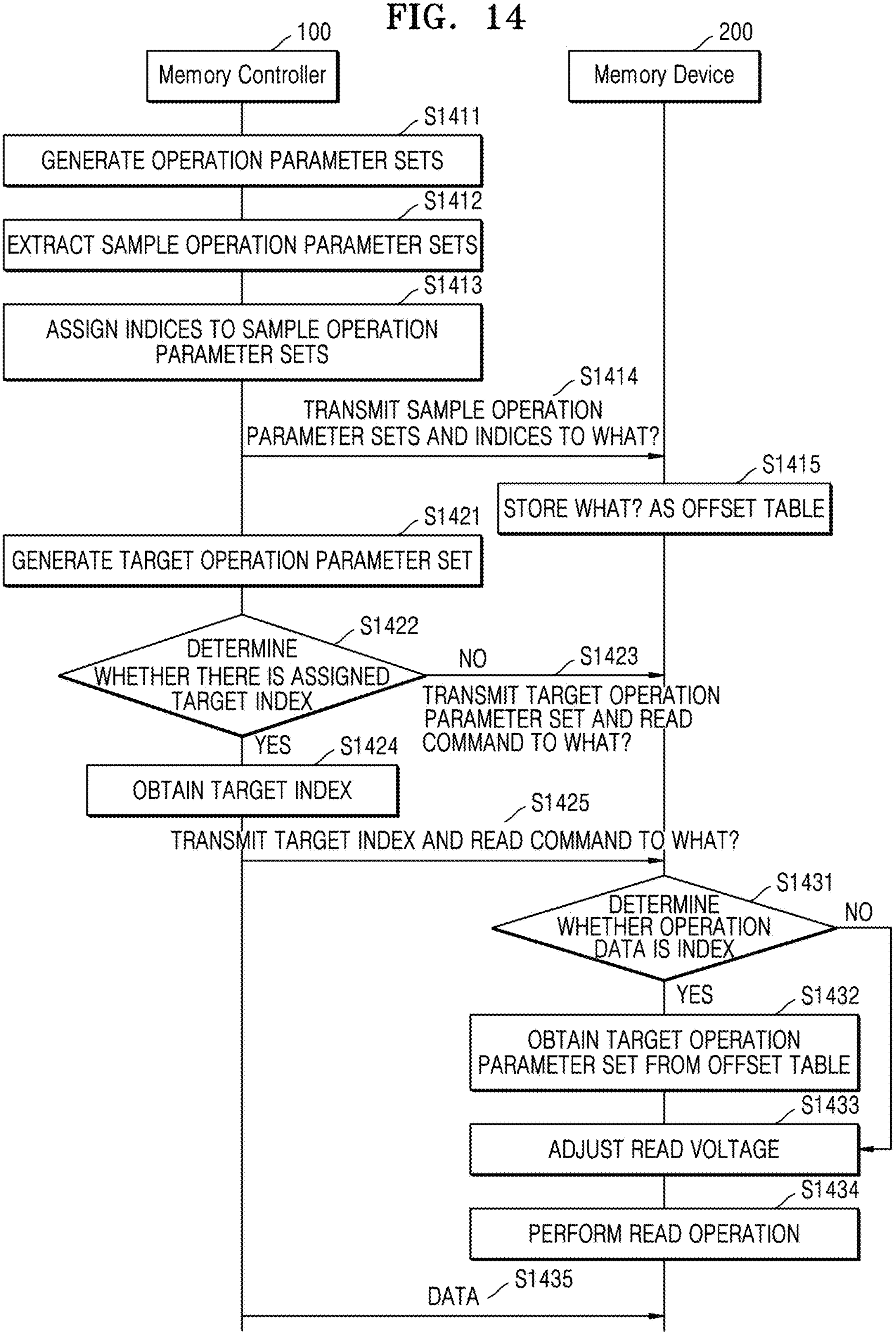
FIG. 14 is a diagram for describing operations of a memory controller and a memory device, according to various example embodiments.

FIG. 14 is a diagram for describing operations of a memory controller and a memory device, according to various example embodiments. The same description as that made above will be omitted.

In operation S1411, the memory controller 100 may generate operation parameter sets. The memory controller 100 may generate operation parameter sets respectively corresponding to a plurality of situations of the memory device 200. One operation parameter set may include one or more operation parameters, for example, four operation parameters, but inventive concepts are not limited thereto. For example, in the case of a read operation, an operation parameter may include an offset level of a read voltage.

In operation S1412, the memory controller 100 may extract sample operation parameter sets. The memory controller 100 may extract relatively frequently occurring situations from among the plurality of situations as sample situations and may extract sample operation parameter sets. The sample operation parameter sets may be operation parameter sets corresponding to the sample situations.

In operation S1413, the memory controller 100 may respectively assign indices to the sample operation parameter sets. In operation S1414, the memory controller 100 may transmit the sample operation parameter sets and the indices respectively assigned to the sample operation parameter sets to the memory device 200 to be stored as the offset table 210 of the memory device 200. In operation S1415, the memory device 200 may store the sample operation parameter sets and the indices as the offset table.

For example, operations S1411 to S1415 may be performed in an initialization period. However, inventive concepts are not limited thereto, and operations S1411 to S1415 may be flexibly performed in and/or after the initialization period. Operations S1421 to S1435 may be performed in a read period.

In operation S1421, the memory controller 100 may generate a target operation parameter set corresponding to a current situation of the memory device 200. Although not shown in FIG. 14, the memory controller 100 may receive a command from a host before operation S1421. For example, the memory controller 100 may receive a read command from the host.

In operation S1422, the memory controller 100 may determine whether there is a target index assigned to the target operation parameter set. The memory controller 100 may check whether there is an operation parameter set matched to the target operation parameter set from among the sample operation parameter sets generated in the initialization period.

In operation S1423, when there is no target index assigned to the target operation parameter set, the memory controller 100 may transmit the target operation parameter set to the memory device 200. The memory controller 100 may also transmit the command to the memory device 200. For example, the memory controller 100 may transmit the read command and the target operation parameter set to the memory device 200.

In operation S1424, when there is the assigned target index, the memory controller 100 may obtain the target index. In operation S1425, when there is the target index assigned to the target operation parameter set, the memory controller 100 may transmit the target index to the memory device 200. The memory controller 100 may transmit the read command and the target index to the memory device 200.

In operation S1431, the memory device 200 may determine whether operation data received from the memory controller 100 is an index. When the index is received, the memory device 200 may perform operation S1432. When the index is not received, the memory device 200 may perform operation S1433. When the target operation parameter set is received, the memory device 200 may perform operation S1433.

In operation S1432, the memory device 200 may obtain the target operation parameter set mapped to the target index by using the offset table 210. In operation S1433, the memory device 200 may adjust a read voltage based on target operation parameters of the target operation parameter set. In operation S1434, the memory device 200 may perform a read operation by using the adjusted read voltage. The memory device 200 may read data stored in a memory cell array. In operation S1435, the memory device 200 may transmit the read data to the memory controller 100.

Figure 15:
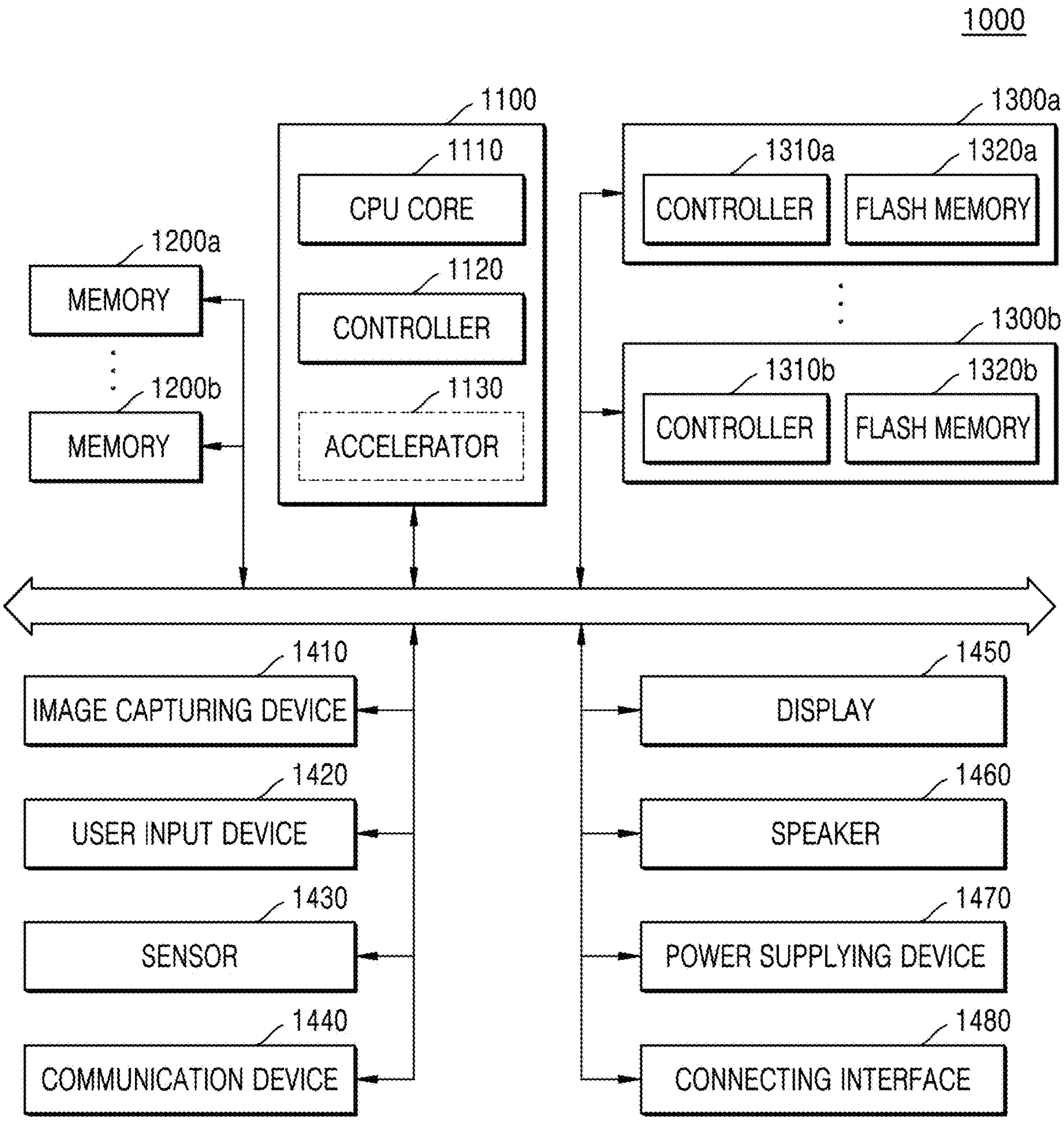
FIG. 15 illustrates a system to which a storage device is applied, according to various example embodiments.

FIG. 15 illustrates a system to which a storage device is applied, according to various example embodiments. Each of storage devices 1300*a* and 1300*b* of FIG. 15 may be or may include (or be included in) a memory system (e.g., the memory system 10 of FIG. 1) described in the inventive concept. A system 1000 of FIG. 15 may be or may include or be included in basically a mobile system such as one or more of a mobile phone, a smartphone, a tablet personal computer (PC), a wearable device, a healthcare device, or an Internet of things (IOT) device. However, the system 1000 of FIG. 14 is not limited to the mobile system, and may be, include, or be included in one or more of a personal computer, a laptop computer, a server, a media player, or an automotive device such as a navigation device.

Referring to FIG. 15, the system 1000 may include a main processor 1100, memories 1200*a* and 1200*b*, and the storage devices 1300*a* and 1300*b*, and may additionally include at least one of an image capturing device 1410, a user input device 1420, a sensor 1430, a communication device 1440, a display 1450, a speaker 1460, a power supplying device 1470, and a connecting interface 1480.

The main processor 1100 may control an overall operation of the system 1000, more particularly, operations of other elements constituting the system 1000. The main processor 1100 may be implemented as a general-purpose processor, a dedicated processor, or an application processor.

The main processor 1100 may include at least one CPU core 1110, and may further include a controller 1120 for controlling the memories 1200*a* and 1200*b* and/or the storage devices 1300*a* and 1300*b*. According to various example embodiments, the main processor 1100 may further include an accelerator 1130 that is a dedicated circuit for high-speed data computation such as artificial intelligence (AI) data computation. The accelerator 1130 may include one or more of a graphics processing unit (GPU), a neural processing unit (NPU), and/or a data processing unit (DPU), and may be implemented as a separate chip physically independent of other elements of the main processor 1100.

The memories 1200*a* and 1200*b* may each be used as a main memory device of the system 1000, and may include a volatile memory such as an SRAM and/or a DRAM but may also or alternatively include a nonvolatile memory such as one or more of a flash memory, a PRAM, and/or an RRAM. The memories 1200*a* and 1200*b* may be implemented in the same package as the main processor 1100.

The storage devices 1300*a* and 1300*b* may each function as a nonvolatile storage device in which data is stored regardless of whether power is supplied, and may have a larger storage capacity than the memories 1200*a* and 1200*b*. The storage devices 1300*a* and 1300*b* may include storage controllers 1310*a* and 1310*b*, and nonvolatile memory (NVM) devices 1320*a* and 1320*b* that store data under the control of the storage controllers 1310*a* and 1310*b*. The NVM devices 1320*a* and 1320*b* may each include a flash memory having a 2D structure and/or a 3D vertical NAND (V-NAND) structure, but may or alternatively include other types of nonvolatile memories such as a PRAM and/or an RRAM. The memory system (e.g., the memory system 10 of FIG. 1) described with reference to FIGS. 1 to 14 may be applied to the storage devices 1300*a* and 1300*b* of FIG. 15.

The storage devices 1300*a* and 1300*b* may be included in the system 1000 while being physically separated from the main processor 1100, or may be implemented in the same package as the main processor 1100. Also, because the storage devices 1300*a* and 1300*b* have a form such as a solid-state device (SSD) or a memory card and may be detachably coupled to other elements of the system 1000 through an interface such as the connecting interface 1480 described below. The storage devices 1300*a* and 1300*b* may be devices to which one or more standard protocols such as, but not limited to, one or more of universal flash storage (UFS), embedded multi-media card (eMMC), or non-volatile memory express (NVMe) is applied.

The image capturing device 1410 may capture a still image and/or a moving image and may be, include, or be included in one or more of a camera, a camcorder, and/or a webcam. The user input device 1420 may receive various types of data input from a user of the system 1000 and may be, include, or be included in one or more of a touch pad, a keypad, a keyboard, a mouse, and/or a microphone. The sensor 1430 may detect various types of physical quantities that may be obtained from the outside and may convert the detected physical quantities into electrical signals. The sensor 1430 may be, include, or be included in one or more of a temperature sensor, a pressure sensor, an illuminance sensor, a location sensor, an acceleration sensor, a biosensor, and/or a gyroscope sensor.

The communication device 1440 may transmit and receive signals to and from other devices outside the system 1000 according to various communication protocols. The communication device 1440 may include an antenna, a transceiver, and/or a modem. The display 1450 and the speaker 1460 may function as output devices that respectively output visual information and auditory information to the user of the system 1000. The power supplying device 1470 may appropriately convert power supplied from a battery (not shown) included in the system 1000 and/or an external power supply source and may supply the power to each element of the system 1000.

The connecting interface 1480 may provide a connection between the system 1000 and an external device connected to the system 1000 to transmit and receive data to and from the system 1000. The connecting interface 1480 may be implemented in any of various interface methods such as one or more of advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), secure digital (SD) card, multi-media card (MMC), eMMC, UFS, embedded universal flash storage (eUFS), or compact flash (CF) card interface.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

As described above, various example embodiments have been illustrated in the drawings and described in the specification. While some example embodiments have been described by using specific terms, the terms have merely been used to explain the technical idea of inventive concepts and should not be construed as limiting the scope of the inventive concept defined by the claims. Hence, it will be understood by one of ordinary skill in the art that various modifications and other equivalent embodiments may be made therefrom. Accordingly, the technical scope of inventive concepts should be defined by the following claims. Furthermore, example embodiments are not necessarily mutually exclusive. For example, some example embodiments may include one or more features described with reference to one or more figures, and may also include one or more other features described with reference to one or more other figures.

While the inventive concept has been particularly shown and described with reference to embodiments thereof, it will be understood that various changes in form and details may be made therein without departing from the spirit and scope of the following claims.

What is claimed is:

1. A memory system comprising:

a memory device comprising a memory cell array and an offset table; and a memory controller configured to:

generate a target operation parameter set corresponding to a current situation of the memory device, determine whether a target index is assigned to the target operation parameter set, based on the target index being assigned to the target operation parameter set, transmit a first operation command and the target index to the memory device, based on no target index being assigned to the target operation parameter set, transmit a second operation command and the target operation parameter set to the memory device, wherein the offset table comprises mapping information between sample operation parameter sets respectively corresponding to sample situations of the memory device and indices respectively assigned to the sample operation parameter sets, and wherein the memory device is configured to:

in response to receiving the first operation command and the target index, obtain target operation parameters mapped to the target index based on the offset table, adjust read voltages based on the target operation parameters, and read data stored in the memory cell array by using the adjusted read voltages, and in response to receiving the second operation command and the target operation parameter set, adjust read voltages based on the target operation parameter set, and read data stored in the memory cell array by using the adjusted read voltages, wherein the target index is transmitted to the memory device for a first clock cycle number, and the target operation parameter set is transmitted to the memory device for a second clock cycle number greater than the first clock cycle number.

2. The memory system of claim 1, wherein a data amount of the target index transmitted by the memory controller to the memory device is less than a data amount of the target operation parameter set transmitted by the memory controller to the memory device.

3. The memory system of claim 1, wherein in an initialization period the memory controller is configured to generate operation parameter sets respectively corresponding to a plurality of situations of the memory device, and respectively assign indices to the sample operation parameter sets corresponding to the sample situations that are some of the plurality of situations, transmit the sample operation parameter sets and the indices respectively assigned to the sample operation parameter sets to the memory device, and store the sample operation parameter sets and the indices as the offset table.

4. The memory system of claim 3, wherein the memory controller is further configured to extract the sample operation parameter sets based on a use frequency of each operation parameter set from among the operation parameter sets respectively corresponding to the plurality of situations.

5. The memory system of claim 1, wherein the memory device is further configured to obtain target operation parameters mapped to the target index based on the offset table in response to receiving the target index and a first read command, to adjust read voltages based on the target operation parameters, and to read data stored in the memory cell array by using the adjusted read voltages.

6. The memory system of claim 1, wherein the memory device is further configured to, when receiving the target operation parameter set and a second read command, read data stored in the memory cell array by using read voltages adjusted based on the target operation parameters.

7. The memory system of claim 1, wherein the memory device is further configured to receive a read command, an address, and operation data from the memory controller and to identify the operation data received by the memory device as one of the target index and the target operation parameter set based on a number of pieces of operation data received by the memory device.

8. The memory system of claim 7, wherein the memory device is further configured to, identify the operation data as the target index in response to the number of pieces of operation data received by the memory device being a first number, and identify the operation data as the target operation parameter set in response to the number of pieces of operation data received by the memory device being a second number, wherein the second number is greater than the first number.

9. A memory controller comprising:

an index processor configured to generate sample operation parameter sets corresponding to sample situations of a memory device and indices respectively assigned to the sample operation parameter sets, the index processor configured to generate a target operation parameter set corresponding to a current situation of the memory device and associated with compensating for operational characteristics of the memory device in the current situation, and the index processor configured to determine whether the target operation parameter set is matched to one of the sample operation parameter sets and whether a target index is assigned to the target operation parameter set, and based on the target index being assigned to the target operation parameter set, transmit a first operation command and the target index as operation data, and based on no target index being assigned to the target operation parameter set, transmit a second operation command and the target operation parameter set as the operation data; and a memory interface configured to transmit the operation data to the memory device, wherein the target index is transmitted to the memory device for a first clock cycle number, and the target operation parameter set is transmitted to the memory device for a second clock cycle number greater than the first clock cycle number.

10. The memory controller of claim 9,
wherein the first operation command is different from the second operation command.

11. The memory controller of claim 10, wherein the memory interface is further configured to transmit the first operation command, an address, and the target index to the memory device through a data signal in response to the target index being assigned to the target operation parameter set.

12. The memory controller of claim 9, wherein in an initialization period the index processor is further configured to,
generate a plurality of operation parameter sets respectively corresponding to a plurality of situations of the memory device, and
extract the sample operation parameter sets based on a use frequency of each operation parameter set from among the plurality of operation parameter sets respectively corresponding to the plurality of situations.

13. The memory controller of claim 12, wherein a use frequency of the sample operation parameter sets extracted from among the operation parameter sets respectively corresponding to the plurality of situations is higher than a use frequency of remaining operation parameter sets from among the operation parameter sets respectively corresponding to the plurality of situations.

14. An operating method of a memory controller, the operating method comprising:
generating sample operation parameter sets and indices respectively assigned to the sample operation parameter sets to be stored as an offset table included in a memory device;
generating a target operation parameter set corresponding to a current situation of the memory device;
determining whether the target operation parameter set is matched to one of the sample operation parameter sets and there is a target index assigned to the target operation parameter set, and
transmitting one of the target index and the target operation parameter set to the memory device based on the determining, wherein the transmitting and the determining comprise:
determining that the target index is assigned to the target operation parameter set,
based on the target index being assigned to the target operation parameter set, transmitting a first operation command and the target index to the memory device, or
determining that no target index is assigned to the target operation parameter set,
based on no target index being assigned to the target operation parameter set, transmitting a second operation command and the target operation parameter set to the memory device,
wherein the target index is transmitted to the memory device for a first clock cycle number, and the target operation parameter set is transmitted to the memory device for a second clock cycle number greater than the first clock cycle number.

15. The operating method of claim 14, wherein
the transmitting of the target index to the memory device further comprises transmitting a first read command to the memory device, and
the transmitting of the target operation parameter set to the memory device further comprises transmitting a second read command, different from the first read command, to the memory device.

* * * * *